United States Patent
Kiuchi et al.

(10) Patent No.: US 9,151,870 B2
(45) Date of Patent: Oct. 6, 2015

(54) OPTICAL FILM, AND POLARIZING PLATE AND LIQUID CRYSTAL DISPLAY DEVICE USING SAME

(75) Inventors: Hiroyoshi Kiuchi, Hachioji (JP); Takatugu Suzuki, Hachioji (JP); Kiyoshi Fukusaka, Fussa (JP)

(73) Assignee: KONICA MINOLTA, INC., Tokyo (JP)

( * ) Notice: Subject to any disclaimer, the term of this patent is extended or adjusted under 35 U.S.C. 154(b) by 161 days.

(21) Appl. No.: 13/883,899

(22) PCT Filed: Dec. 2, 2011

(86) PCT No.: PCT/JP2011/077893
§ 371 (c)(1),
(2), (4) Date: May 7, 2013

(87) PCT Pub. No.: WO2012/077587
PCT Pub. Date: Jun. 14, 2012

(65) Prior Publication Data
US 2013/0222741 A1  Aug. 29, 2013

(30) Foreign Application Priority Data

Dec. 8, 2010 (JP) ................................ 2010-273296

(51) Int. Cl.

| | |
|---|---|
| *G02F 1/13363* | (2006.01) |
| *G02F 1/1335* | (2006.01) |
| *G02B 1/04* | (2006.01) |
| *G02B 5/30* | (2006.01) |
| *C08J 5/18* | (2006.01) |
| *C08L 1/10* | (2006.01) |
| *C08L 1/14* | (2006.01) |

(52) U.S. Cl.
CPC ... *G02B 1/04* (2013.01); *C08J 5/18* (2013.01); *C08L 1/10* (2013.01); *C08L 1/14* (2013.01); *G02B 5/305* (2013.01); *G02B 5/3083* (2013.01); *G02F 1/13363* (2013.01); *G02F 1/133528* (2013.01); *C08J 2301/10* (2013.01); *C08J 2301/14* (2013.01); *Y10T 428/105* (2015.01); *Y10T 428/1041* (2015.01)

(58) Field of Classification Search
CPC ............... C08L 1/10; C08L 1/14; G02B 1/04; G02B 5/305; G02B 5/3083; C08J 2301/10; C08J 2301/14; G02F 1/133528; G02F 1/13363; Y10T 428/105; Y10T 428/1041
USPC ................ 428/1.33; 349/96, 122; 106/170.26
See application file for complete search history.

(56) References Cited

U.S. PATENT DOCUMENTS

| | | | |
|---|---|---|---|
| 2002/0102369 A1* | 8/2002 | Shimizu et al. ............... | 428/1.33 |
| 2006/0286313 A1* | 12/2006 | Fukagawa et al. ........... | 428/1.31 |
| 2009/0096962 A1* | 4/2009 | Shelton et al. ................. | 349/96 |
| 2009/0130382 A1* | 5/2009 | Otoshi et al. .................. | 428/131 |

FOREIGN PATENT DOCUMENTS

| | | |
|---|---|---|
| JP | 2002-363342 A | 12/2002 |
| JP | 2010-066752 A | 3/2010 |
| JP | 2010-112987 A | 5/2010 |
| JP | 2010-170128 A | 8/2010 |
| WO | WO 2007/102340 A1 | 9/2007 |
| WO | WO 2008/143765 A2 | 11/2008 |

OTHER PUBLICATIONS

International Search Report of PCT/JP2011/077893 mailed Feb. 14, 2012.

* cited by examiner

*Primary Examiner* — Sophie Hon
(74) *Attorney, Agent, or Firm* — Lucas & Mercanti, LLP

(57) ABSTRACT

The purpose of the present invention is to provide an optical film having a large phase difference value, small moisture-induced fluctuation in the phase difference value, small photoelastic coefficient and excellent bondability with a polarizer. The optical film includes a cellulose ester (A) which satisfy formulae (1) and (2) below and a vinyl-based polymer (B). A content ratio of the cellulose ester (A) and the vinyl-based polymer (B) is from 95:5 to 50:50 by mass, the vinyl-based polymer (B) is composed of a non-aromatic vinyl-based monomer having a solubility parameter of 17.5 $(MPa^{1/2})$ or larger and smaller than 20.0 $(MPa^{1/2})$ and a weight average molecular weight of the vinyl-based polymer (B) is from 500 to 10,000: where $$1.0 \leq X + \Sigma Y_i < 2.0 \qquad \text{formula (1)}$$

$$4.0 \leq 2 \times X + \Sigma(n_i \times Y_i) < 6.0 \qquad \text{formula (2)}$$

9 Claims, No Drawings

OPTICAL FILM, AND POLARIZING PLATE AND LIQUID CRYSTAL DISPLAY DEVICE USING SAME

CROSS REFERENCE TO RELATED APPLICATION

This Application is a 371 of PCT/JP2011/077893 filed on Dec. 2, 2011, which claimed the priority of Japanese Patent Application No. 2010-273296 filed on Dec. 8, 2010; both applications are incorporated herein by reference in its entirety.

TECHNICAL FIELD

The present invention relates to an optical film, and a polarizing plate and a liquid crystal display device using the optical film.

BACKGROUND ART

An optical film for compensating phase difference ascribable to birefringence of liquid crystal cells (simply referred to as "optical compensation film", hereinafter) has widely been used in a liquid crystal display device. Among optical compensation films ever proposed with various structures, having been widely used are stretched films having transparent resins aligned by stretching. The stretched films are exemplified by those composed of cellulose resin, polycarbonate resin, and cyclic olefin resin.

Among them, an optical film having a cellulose ester (also referred to as "cellulose ester film", hereinafter) has widely been used by virtue of its bondability to poly(vinyl alcohol) which is used for polarizers.

The cellulose ester film, however, tends to cause optical nonuniformity on the periphery of corner portions of a liquid crystal display device (frame-like nonuniformity) due to its large photoelastic coefficient. Another disadvantage relates to a large fluctuation in phase difference value in response to environmental humidity. A cyclic olefin resin film has been known as an optical compensation film with a small photoelastic coefficient, but it has only a poor bondability with poly(vinyl alcohol) which composes the polarizer.

Methods of mixing a specific polymer to the cellulose ester film have been proposed in order to improve the frame-like nonuniformity or the humidity-induced fluctuation in phase difference value. Patent Literature 1 proposes an optical film containing an acrylic polymer and a cellulose ester, which is directed to improve the frame-like nonuniformity. Patent Literature 2 discloses an optical film containing a cellulose ester and a compound with negative birefringence, which is directed to improve durability against humidity and heat. Patent Literature 3 proposes an optical film containing a cellulose ester and a specific polystyrene, which is directed to improve the moisture-induced fluctuation. The present inventors, however, found out from our investigations that when added with an increased amount of acrylic polymer or the like so as to thoroughly improve the moisture-induced fluctuation in the phase difference value and frame-like nonuniformity, unfortunately a sufficient level of phase difference value required for the optical compensation film could not achieved and moreover bondability with the polarizer was poor.

Patent Literature 4 proposes an optical film containing a cellulose ester with a small degree of substitution with acyl group. The present inventors, however, found from our investigations that the optical film became poor in the bondability with poly(vinyl alcohol) bonded as the polarizer when the total degree of substitution with acyl group was smaller than 2.0. It was also found out that the cellulose ester with a total degree of substitution with acyl group of smaller than 2.0 is distinctively eluted into a saponifying solution, resulting in coloration of the saponifying solution.

It has therefore been desired to develop an optical film which is large in the phase difference value, small in the moisture-induced fluctuation in phase difference value, small in the photoelastic coefficient, and excellent bondability with the polarizer.

CITATION LIST

Patent Literature

Patent Literature International Publication WO2007/102340 pamphlet
Patent Literature 2: JP-2010-66752A
Patent Literature 3: JP-2010-170128A
Patent Literature 4: Published Japanese Translation No. 2010-529216

SUMMARY OF THE INVENTION

Technical Problem to be Solved

The present invention is conceived after considering the above-described problems in the prior art, and an object of which is to provide an optical film which is large in the phase difference value, small in the moisture-induced fluctuation in phase difference value, small in the photoelastic coefficient, and excellent bondability with the polarizer. It is another object of the present invention to provide a polarizing plate and a liquid crystal display device using the optical film.

Means to Solve the Problem

The above-described object of the present invention may be achieved by the configurations below.

1. An optical film including a cellulose ester (A) which satisfy formulae (1) and (2) below and a vinyl-based polymer (B), in which
a content ratio of the cellulose ester (A) and the vinyl-based polymer (B) is within a range from 95:5 to 50:50 by mass,
the vinyl-based polymer (B) is composed of a non-aromatic vinyl-based monomer having a solubility parameter of 17.5 $(MPa^{1/2})$ or larger and smaller than 20.0 $(MPa^{1/2})$, and
a weight average molecular weight of the vinyl-based polymer (B) is within a range from 500 to 10,000.

$$1.0 \le X + \Sigma Y_i < 2.0, \text{ and} \qquad \text{Formula (1)}$$

$$4.0 \le 2 \times X + \Sigma(n_i \times Y_i) < 6.0 \qquad \text{formula (2)}$$

(in the formula, X represents a degree of substitution with acetyl group, $Y_i$ represents a degree of substitution with acyl group having 3 or more carbon atoms, and $n_i$ represents a number of carbon atoms of the acyl group having 3 or more carbon atoms, and i represents an integer of 3 or larger, which equals to the number of carbon atoms $n_i$).

2. The optical film according to item 1 in which the content ratio of the cellulose ester (A) and the vinyl-based polymer (B) is within a range from 80:20 to 51:49 by mass.

3. The optical film according to item 1 in which the vinyl-based polymer has a molecular weight distribution (Mw/Mn) of 1.1 or larger and 2.5 or smaller.

4. The optical film according to item 1 in which the cellulose ester is a cellulose acetate propionate.

The optical film according to item 1 in which a retardation Ro given by, a equation (I) below is 20 to 100 nm, and a retardation Rth given by a equation (II) below is 70 to 300 nm, both measured under an environment of 23° C. and 55% RH with a light having a wavelength of 590 nm.

$$Ro=(nx-ny) \times d, \text{ and} \quad \text{Equation (I)}$$

$$Rth=\{(nx+ny)/2-nz\} \times d \quad \text{equation (II)}$$

(where nx represents a refractive index in a direction x in plane of the optical film in which the refractive index gives a maximum, ny represents a refractive index in a direction y normal to the direction x in plane of the optical film, nz represents a refractive index in a thickness-wise direction z of the optical film, and d (nm) represents a thickness of the optical film).

6. The optical film according to item 1 in which a fluctuation range ΔRo of a retardation Ro, given by the equation (III) below, in response to changes in humidity is smaller than 10%.

$$\Delta Ro=\{[Ro(23°\text{C.},10\%\text{ RH})-Ro(23°\text{C.},80\%\text{ RH})/Ro(23°\text{C.},55\%\text{ Rh})\} \times 100(\%) \quad \text{Equation (III)}$$

(in the formula, Ro(23° C.,10% Rh), Ro(23° C., 80°/RH) and Ro(23° C., 55% RH) represent in-plane retardation Ro of a phase difference film after controlled in humidity under environments of 23° C. and 10% RH, 23° C. and 80% RH, and 23° C. and 55% RH for 36 hours, respectively, and measured at a measurement wavelength of 590 nm).

7. The optical film according to item 1 in which a photoelastic coefficient is $-5 \times 10^{-12}$ Pa$^{-1}$ or larger and $10 \times 10^{-12}$ Pa$^{-1}$ or smaller, which is measured under an environment of 23° C. and 55% RH and with a light having a wavelength of 590 nm.

8. A polarizing plate including the optical film according to item 1 on at least one surface of a polarizer.

9. A liquid crystal display device including the polarizing plate according to item 8 on at least one surface of a liquid crystal cell.

Advantageous Effects of Invention

According to the present invention, an optical film which is large in the phase difference value, small in the moisture-induced fluctuation in phase difference value, small in the photoelastic coefficient and excellent bondability with the polarizer may be provided. Also a polarizing plate and a liquid crystal display device using the optical film may be provided.

EMBODIMENTS TO CARRY OUT THE INVENTION

Best embodiments for carrying out the present invention will now be detailed below, without limiting the present invention.

The present inventors conducted diligent investigations aiming at solving the problems described above and found out that a cellulose ester with a total degree of substitution with acyl group of smaller than 2.0 was particularly excellent in revelation of phase difference value, and that the moisture-induced fluctuation in the phase difference value, which generally degrades as a result of increase in hydroxy group content, was successfully suppressed to an equivalent level of the conventional cellulose ester, by adjusting the total number of carbon atoms of the acyl group in the cellulose ester.

The present inventors also found that, while the cellulose ester added with a polymer containing a monomer having the solubility parameter larger than that specified by the range of the present invention would considerably degrade the phase difference value and would degrade the moisture-induced fluctuation in the phase difference value, an optical film successfully suppressed in the degradation of phase difference value and small in the moisture-induced fluctuation in phase difference value was obtainable by using a vinyl-based polymer composed of a non-aromatic, vinyl-based monomer with a specific solubility parameter. In addition, the present inventors found that an optical film which is large in the phase difference value and small in the photoelastic coefficient was obtainable by using a vinyl-based polymer having a specific molecular weight distribution.

Note that, the cellulose ester with a total degree of substitution with acyl group of smaller than 2.0 used in the present invention may still suffer from poor bondability with poly (vinyl alcohol) which composes the polarizer, and coloring of the saponifying solution. However, the present inventors surprisingly found out that the bondability with the polarizer was improved and the coloring of the saponifying solution was suppressed by mixing the vinyl-based polymer composed of monomers with a specific solubility parameter of the present invention, while details of the reason remain unclear.

In this way, the present inventors found out that the problems described above may be solved by mixing the cellulose ester with a specific degree of substitution with acyl group of the present invention, and the vinyl-based polymer composed of the monomer with a specific solubility parameter. The findings led us to complete the present invention.

The present invention will be detailed below.

(Optical Film)

In the present invention, "optical film" means functional film used for various display devices such as liquid crystal display, plasma display and organic EL display, and in more details, includes polarizing plate protective film, phase difference film, anti-reflection film, brightness enhancement film, hard coat film, anti-glare film, anti-static film, optical compensation film for widening angle of view, which are used for liquid crystal display devices.

(Cellulose Ester)

The optical film of the present invention contains the cellulose ester which satisfies the formulae (1) and (2) below $$1.0 \leq X + \Sigma Y_i < 2.0 \quad \text{Formula (1)}$$

$$4.0 \leq 2 \times X + \Sigma(n_i \times Y_i) < 6.0 \quad \text{Formula (2)}$$

In the formula, X represents the degree of substitution with acetyl group, $Y_i$ represents the degree of substitution with acyl group having 3 or more carbon atoms, and $n_i$ represents the number of carbon atoms in the acyl group having 3 or more carbon atoms, and i represents an integer of 3 or larger, which equals to the number of carbon atoms $n_i$.

The degree of substitution with acyl group may be measured in compliance with ASTM-D817-96.

The cellulose ester of the present invention is preferably a carboxylate ester whose ester group is a straight-chain or branch group having approximately 2-22 carbon atoms. The carboxylate group may form a ring or may be an aromatic carboxylate ester. The carboxylate group may have a substituent. The cellulose ester is particularly preferably a lower fatty acid ester having 6 or fewer carbon atoms.

Preferable examples of the cellulose ester specifically include mixed fatty acid ester of cellulose having bound thereto not only acetyl group but also propionate group or butyrate group, exemplified by cellulose acetate propionate, cellulose acetate butyrate, and cellulose acetate propionate butyrate. Among them, cellulose acetate propionate is preferable.

The formula (1) will now be explained. The formula (1) expresses a range of average total degree of substitution $(X+\Sigma Y_i)$ with acyl group substituted on a single glucose unit of the cellulose ester. The smaller the total degree of substitution, the larger the phase difference value; however, if the total degree of substitution is smaller than 1.0, quality of film surface will be degraded due to increased viscosity of dope and the water resistance will extremely be degraded. If the total degree of substitution is 2.0 or larger, the water resistance will be improved but the phase difference will become more difficult to be revealed.

The formula (2) will be explained. The formula (2) expresses a range of average total number of carbon atoms $(2 \times X+\Sigma(n_i \times Y_i))$ of acyl group substituted on a single glucose unit of the cellulose ester. For an exemplary case of cellulose acetate propionate, the number of carbon atoms of acetyl group is two and the number of carbon atoms $n_3$ of propionyl group is 3, so that the total number of carbon atoms is given by $(2 \times X+3 \times Y_3)$, after being respectively multiplied by the degrees of substitution. Examinations in the present invention revealed that while the moisture-induced fluctuation in the phase difference value increased as the total degree of substitution reduced, the moisture-induced fluctuation in the phase difference value was successfully reduced by adjusting the total number of carbon atoms to 4.0 or larger and smaller than 6.0. The phase difference will less likely to be revealed and the photoelastic coefficient will increase in a case where the total number of carbon atoms is 6.0 or larger. The total degree of substitution $(X+\Sigma Y_i)$ is given by $1.0 \leq X+\Sigma Y_i < 2.0$, more preferably by $1.1 \leq X+\Sigma Y_i < 1.9$, and more preferably by $1.2 \leq X+\Sigma Y_i < 1.8$.

In order to obtain optical characteristics to be targeted at cellulose esters with different degrees of substitution may be used in a mixed manner. The mixing ratio is preferably 10:90 to 90:10 (ratio by mass).

Number average molecular weight (Mn) of the cellulose ester in the present invention preferably falls in the range from 30,000 to 300,000, from the viewpoint of large mechanical strength of the obtainable film, more preferably in the range from 50,000 to 200,000.

Molecular weight distribution (Mw/Mn), which represents ratio of weight average molecular weight (Mw) and the number average molecular weight (Mn) of the cellulose ester in the present invention, is preferably 1.4 to 4.0.

The weight average molecular weight (Mw) and the number average molecular weight (Mn) of the cellulose ester may be measured by gel permeation chromatography (GPC).

Exemplary conditions of measurement will be shown below, but are not limited thereto. Any equivalent method may also be used.
Solvent: methylene chloride
Column: Shodex K806, K805, K803G (from Showa. Denko K.K., these three used in connection)
Column temperature: 25° C.
Sample concentration: 0.1% by mass
Detector: RI Model 504 (from GL Sciences Inc.)
Pump: L6000 (from Hitachi Ltd.)
Flow rate: 1.0 ml/min
Calibration curve: standard curve based on 13 samples of STK standard polystyrene (from Tosoh Corporation), Mw=1,000,000 to 500, used at nearly regular intervals.

Cellulose used as an origin of the cellulose ester in the present invention is exemplified by cotton linter, wood pulp and kenaf, without special limitation. The cellulose esters obtained from these origins may be mixed in an arbitrary ratio.

The cellulose ester such as cellulose acetate propionate in the present invention may be manufactured by any of publicly-known methods. In general, cellulose as a raw material and a predetermined organic acid (acetic acid, propionic acid, etc.), acid anhydride (acetic anhydride, propionic anhydride, etc), and catalyst (sulfuric acid, etc.) are mixed so as to esterify the cellulose. The reaction is proceeded until a cellulose triester is formed. In the triester, three hydroxy groups in a glucose unit are substituted by the acyl groups of the organic acid. Mixed ester-type cellulose ester, such as cellulose acetate propionate and cellulose acetate butyrate, may be manufactured by using two species of organic acid at the same time. The cellulose triester is then hydrolyzed to thereby synthesize the cellulose ester with a desired degree of acyl substitution. The cellulose ester is finally obtained after the individual processes of filtration, precipitation, washing with water, dehydrating, drying and so forth. The cellulose ester in the present invention may alternatively be obtained by hydrolyzing commercially available cellulose esters (CAP-482-20, CAP-141-20, CAB-381-20, etc., all from Eastman Chemical Company, Kingsport, Tenn.). In this case, the cellulose ester with a desired degree of substitution with acyl group, weight average molecular weight (Mw) number average molecular weight (Mn), and molecular weight distribution (Mw/Mn) may be obtained by appropriately selecting the reaction time, reaction temperature, solvent (acetic acid, propionic acid, butyric acid, etc.), catalytic species (sulfuric acid, hydrochloric acid, phosphoric acid, etc.), amount of catalyst, and so forth. More specifically, the synthesis may conform to the method described in Published Japanese Translation of PCT International Publication for Patent publication No. 2010-529216.

(Vinyl-Based Polymer)

The optical film of the present invention contains a vinyl-based polymer, and the vinyl-based polymer is composed of a non-aromatic vinyl-based monomer with a solubility parameter of 17.5 $(MPa^{1/2})$ or larger and smaller than 20.0 $(MPa^{1/2})$.

In the present invention, the vinyl-based polymer may be obtained by polymerizing a single species of non-aromatic vinyl-based monomer with a solubility parameter of 17.5 $(MPa^{1/2})$ or larger and smaller than 20.0 $(MPa^{1/2})$, or by co-polymerizing a plurality of species of non-aromatic vinyl-based monomer each having a solubility parameter of 17.5 $(MPa^{1/2})$ or larger and smaller than 20.0 $(MPa^{1/2})$.

The solubility parameter of the non-aromatic vinyl-based monomer in the present invention (referred to as "SP value", hereinafter) is determined by the equations below. Note that the wording of "SP value" in the description below always means the SP value of the monomer, and values of which will be given simply by numerals without the unit "$MPa^{1/2}$".

[Mathematical Formula 1]
$$\delta_d = \frac{\Sigma F_{di}}{V}, \delta_p = \frac{\sqrt{\Sigma F_{pi}^2}}{V}, \delta_h = \sqrt{\frac{\Sigma E_{hi}}{V}}$$

$$\delta = \sqrt{\delta_d^2 + \delta_p^2 + \delta_h^2}$$

δ: SP value
Fdi: Term contributive to molar dispersion
Fpi: Term for attraction by molar polarity
Ehi: Term for attraction by molar hydrogen bond
V: Sum of molar volume of individual groups The SP value is based on the atomic group summing method proposed by van Krevelen, and is specifically calculated by the method described in Polymer Handbook, Fourth Edition, John Wiley & Sons, Inc., 1999, VII/p. 675 to VII/p. 686.

Specific examples of the non-aromatic vinyl-based monomer in the present invention includes acrylic monomer such as methyl acrylate (SP value: 18.2) and methyl methacrylate (SP value: 18.3), and vinyl ester-based monomer such as vinyl acetate (SF value: 18.2) and vinyl propionate (SP value: 17.9), without special limitation. Among them, acrylic monomer is particularly preferable.

In the present invention, the acrylic monomer preferably has a structure represented by the general formula (I) below,

[Chemical Formula 1]

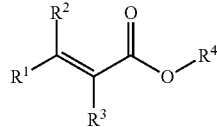

General Formula (I)

In the formula (1), each of $R^1$, $R^2$, $R^3$ and $R^4$ independently represents a hydrogen atom or substituent. If $R^1$, $R^2$, $R^3$ or $R^4$ represents a substituent, the substituent represented by $R^1$, $R^2$, $R^3$ or $R^4$ is not specifically limited so long as it makes the SP value of the acrylic monomer fall in the range specified by the present invention, and is exemplified by alkyl group (methyl group, ethyl group, propyl group, isopropyl group, t-butyl group, pentyl group, hexyl group, octyl group, dodecyl group, trifluoromethyl group, etc.) cycloalkyl group (cyclopropyl group, cyclopentyl group, cyclohexyl group, adamantyl group, etc.), alkylthio group (methylthio group, ethylthio group, etc.), alkenyl group (vinyl group, 2-propenyl group, 3-butenyl group, 1-methyl-3-propenyl group, 3-pentenyl group, 1-methyl-3-butenyl group, 4-hexenyl group, cyclohexenyl group, etc.), halogen atom (fluorine atom, chlorine atom, bromine atom, iodine atom, etc.), alkynyl group (propargyl group, etc.), alkylsulfonyl group (methylsulfonyl group, ethylsulfonyl group, etc.), alkylsulfinyl group (methylsulfinyl group, etc.), phosphono group, acyl group (acetyl group, pivaloyl group, etc.), cyano group, alkoxy group (methoxy group, ethoxy group, propoxy group, etc.), siloxy group, acyloxy group (acetyloxy group, etc.), alkoxycarbonyl group (methoxycarbonyl group, ethoxycarbonyl group, etc.), and nitro group. Each of these substituents may further be substituted by a similar substituent.

In the formula (I), $R^1$ preferably represents a hydrogen atom or methyl group, and more preferably a hydrogen atom.

In the formula (I), $R^2$ preferably represents a hydrogen atom or methyl group, and more preferably a hydrogen atom.

In the formula (I), $R^3$ preferably represents a hydrogen atom or methyl group.

In the formula (I), $R^4$ preferably represents a substituent with a total number of carbon atoms of 1 to 8, more preferably 1 to 6, and particularly a methyl group or ethyl group.

Specific examples of the acrylic monomer in the present invention include methyl acrylate (SP value: 18.2), methyl methacrylate (SP value: 18.3), ethyl acrylate (SP value: 17.9), ethyl methacrylate (SP value: 18.0), n-butyl acrylate (SP value: 17.5), n-butyl methacrylate (SP value: 17.7), cyclohexyl methacrylate (SP value: 18.5), 2-ethoxyethyl methacrylate (SP value: 18.5), and 2-(2-methoxyethoxy)ethyl methacrylate (SP value: 19.1). Among these acrylic monomers, methyl acrylate or methyl methacrylate is particularly preferable.

In the present invention, the SP value of the non-aromatic vinyl-based monomer is 17.5 or larger and smaller than 20.0. In this range, the non-aromatic vinyl-based monomer, when mixed with the cellulose ester, may increase the phase difference value, may reduce the moisture-induced fluctuation in the phase difference value, and may suppress elution of the cellulose ester into the saponifying solution. The non-aromatic vinyl-based monomer having an SP value of less than 17.5 may be degraded in solubility (compatibility) with the cellulose ester. The non-aromatic vinyl-based monomer having an SP value of 20.0 or larger, when mixed with the cellulose ester, may distinctively reduce the phase difference value, increase the moisture-induced fluctuation, and fail in suppressing the elution of the cellulose ester into the saponifying solution.

In the present invention, "non-aromatic vinyl-based monomer" means a vinyl-based monomer having no aromatic ring in the molecule thereof. Since the vinyl-based polymer composed of the non-aromatic vinyl-based monomer has a photoelastic coefficient smaller than that of the vinyl-based polymer having aromatic rings, so that it may give an optical film with a small photoelastic coefficient when mixed with the cellulose ester.

In the present invention, the vinyl-based polymer preferably contains a structural monomer derived from the acrylic monomer by 80% by mass or more and 100% by mass or less, more preferably 90 mol % or more and 100% by mass or less, and particularly 100% by mass. The vinyl-based polymer with a large content of the structural unit derived from the acrylic monomer will give a particularly large phase difference value, when mixed with the cellulose ester, and is therefore preferable since the optical film with a small photoelastic coefficient will be obtained.

The vinyl-based polymer in the present invention will degrade the compatibility with the cellulose ester if the weight average molecular weight (Mw) thereof is too large, and will degrade the coating performance if it is too small. The preferable weight average molecular weight (Mw) is 500 to 10,000, and more preferably 1,000 to 5,000.

The vinyl-based polymer in the present invention will reduce the phase difference value and increase the photoelastic coefficient if the molecular weight distribution (Mw/Mn) thereof is too large, so that the value is preferably 1.1 or larger and 3.0 or smaller, and more preferably 1.1 or larger and 2.5 or smaller.

The weight average molecular weight (Mw) and the number average molecular weight (Mn) were calculated from results of measurement based on gel permeation chromatography (GPC) under the conditions below:
Solvent: tetrahydrofuran
Column: TSK gel Super HM-M (from Tosoh Corporation)
Column temperature: 40° C.
Sample concentration: 0.1% by mass
Apparatus: SLC-8220 (from Tosoh Corporation)
Flow rate: 0.6 ml/min
Calibration curve: standard curve based on 13 samples of STK standard polystyrene (from Tosoh Corporation), Mw=1,000,000 to 500, used at nearly regular intervals.

The vinyl-based polymer in the present invention may be synthesized by an arbitrary appropriate method.

Mode of polymerization reaction for obtaining the vinyl-based polymer in the present invention may be bulk polymerization, solution polymerization, emulsion polymerization, suspension polymerization and so forth, without special limitation.

Polymerization temperature and polymerization time vary depending on species of the monomer to be used, ratio of use and so forth. Preferably, the polymerization temperature is 0 to 150° C. and the polymerization time is 0.5 to 20 hours, and more preferably the polymerization temperature is 80 to 140° C., and the polymerization time is 1 to 10 hours.

For the mode of polymerization using a solvent, the solvent for polymerization is exemplified by aromatic hydrocarbon-based solvent such as toluene, xylene, and ethylbenzene; ketone-based solvent such as methyl ethyl ketone, and methyl isobutyl ketoneketon; and ether-based solvent such as tetrahydrofuran, without special limitation. Each of these solvents may be used independently, or two or more species of which may be used in combination.

In the process of polymerization, a polymerization initiator may be added as necessary. The polymerization initiator is exemplified by organic peroxide such as cumene hydroperoxide, diisopropylbenzene hydroperoxide, di-t-butyl peroxide, lauroyl peroxide, benzoyl peroxide, t-butylperoxyisopropyl carbonate, and t-amylperoxy-2-ethylhexanoate; and azo compound such as 2,2'-azobis(isobutyronitrile), 1,1'-azobis(cyclohexanecarbonitrile), and 2,2'-azobis(2,4-dimethylvaleronitrile) without special limitation. Each of these polymerization initiator may be used alone, or two or more species of which may be used in combination. Amount of use of the polymerization initiator may arbitrarily be determined depending on combination of the monomers to be used, reaction conditions and so forth, without special limitation.

When the vinyl-based polymer in the present invention is synthesized, it is preferable to employ methods capable of adjusting the weight average molecular weight to 10,000 or smaller, and of adjusting the molecular weight distribution to 3.0 or smaller. Such methods of polymerization include a method of using an organic peroxide polymerization initiator such as cumene hydroperoxide; method of using a polymerization initiator, the amount of use of which is larger than the usual polymerization; a method of using a chain transfer agent such as mercapto compound or carbon tetrachloride besides the polymerization initiator; a method of using a polymerization terminator such as benzoquinone and dinitrobenzene, besides the polymerization initiator; and a method of proceeding bulk polymerization using a polymerization catalyst composed of a compound having one thiol group and a secondary hydroxy group or combination of such compound with an organometallic compound, as described in JP-A-2000-128911 or JP-A-2000-344823. All of these methods are preferably used in the present invention.

In the optical film of the present invention, ratio by mass of the cellulose ester (A) and the vinyl-based polymer (B) is specified as (A):(B)=955 to 50:50, more preferably as (A):(B)=80:20 to 51:49 in view of enhancing the effect of the present invention, and particularly as (A):(B)=70:30 to 60:40. If the ratio of the vinyl-based polymer (B) in the optical film of the present invention is too large, revelation of phase difference and bondability with poly(vinyl alcohol) composing the polarizer will degrade, whereas if the ratio of the vinyl-based polymer (B) is too small, the effects of reducing the moisture-induced fluctuation in the phase difference value and of reducing the photoelastic coefficient will be insufficient, and further the elution of the cellulose ester into the saponifying solution will not be suppressed.

The optical film of the present invention may contain at least one of sugar ester compound, plasticizer, UV absorber, antioxidant, and particle described below, in addition to the cellulose ester and the vinyl-based polymer.

(Sugar Ester Compound)

The sugar ester compound is exemplified by ester compounds having one unit or more and 12 units or less of at least either one of a pyranose structure and a furanose structure, with a part of or all of OH groups thereof being esterified.

Degree of esterification of OH groups which reside in the pyranose structure or furanose structure is preferably 70% or more.

Examples of saccharide used as source materials for synthesizing the sugar ester compound include those listed below, without limiting the present invention.

The examples include glucose, galactose, mannose, fructose, xylose, or arabinose, lactose, sucrose, nystose, 1F-fructosyl nystose, stachyose, maltitol, lactitol, lactulose, cellobiose, maltose, cellotriose, maltotriose, raffinose and kestose.

Other examples include genthiobiose, genthiotriose, genthiotetraose, xylotriose, and galactosyl sucrose.

Among them, compounds containing both of the pyranose structure and the furanose structure are particularly preferable.

Examples of such compounds include sucrose, kestose, nystose, 1F-fructosyl nystose, and stachyose, and more preferably sucrose.

Monocarboxylic acid used for esterifying all or a part of OH groups in the pyranose structure or furanose structure is arbitrarily selectable from publicly known aliphatic monocarboxylic acid, alicyclic monocarboxylic acid, and aromatic monocarboxylic acid, without special limitation. The carboxylic acid herein may be used independently, or in the form of mixture of two or more species.

Preferable examples of the aliphatic monocarboxylic acid include saturated fatty acid such as acetic acid, propionic acid, butyric acid, isobutyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated fatty acid such as undecylenic acid, oleic acid, sorbic acid, linoleic acid, linolenic acid, arachidonic acid, and octenoic acid.

Preferable examples of the alicyclic monocarboxylic acid include acetic acid, cyclopentanecarboxylic acid, cyclohexanecarboxylic acid, cyclooctanecarboxylic acid, and derivatives of these compounds.

Preferable examples of the aromatic monocarhoxylic acid include benzoic acid; aromatic monocarboxylic acid having an alkyl group or alkoxy group introduced into a benzene ring of benzoic acid, such as toluic acid; cinnamic acid; aromatic monocarboxylic acid having two or more benzene rings such as benzilic acid, biphenyl carboxylic acid, naphthalene carboxylic acid, and tetralin carboxylic acid; and derivatives of these compounds. More specific examples include xylylic acid, hemellitic acid, mesitylenic acid, prehnitylic acid, γ-isodurylic acid, durylic acid, mesitoic acid, α-isodurylic acid, cuminic acid, α-toluic acid, hydroatropic acid, atropic acid, hydrocinnaraic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthalonic acid, and p-coumaric acid. Benzoic acid is particularly preferable.

Ester compound of oligosaccharide may be used as the compound having 1 to 12 units of at least either one of the pyranose structural unit and the furanose structural unit.

The oligosaccharide is a compound obtained by allowing an enzyme such as amylase to act on starch, sucrose or the like. The oligosaccharide is exemplified by malto-oligosaccharide, isomalto-oligosaccharide, fructo-oligosaccharide, galacto-oligosaccharide, and xylo-oligosaccharide.

Examples of the sugar ester compound will be shown below, without limiting the present invention.
Monopet SB: from Dai-ichi Kogyo Seiyaku Co. Ltd., Monopet SOA: from Dai-Ichi Kogyo Seiyaku Co. Ltd.

Amount of addition of the sugar ester compound is preferably 0.5 to 30% by mass, and particularly 5 to 20% by mass, of the total mass of the polymer (A) and the cellulose ester.

(Plasticizer)

The optical film of the present invention may contain a plasticizer. The plasticizer is preferably selected from polyvalent carboxylate ester-based plasticizer, glycolate-based plasticizer, phthalic acid ester-based plasticizer, fatty acid ester-based plasticizer and polyhydric alcohol ester-based plasticizer, and polyester-based plasticizer, although not specifically limited. When two or more species of plasticizer are used, at least one of which is preferably a polyhydric alcohol ester-based plasticizer.

The polyhydric alcohol ester-based plasticizer is composed of an ester formed between an aliphatic polyhydric alcohol with a valency of 2 or above, and a monocarboxylic acid, and preferably has in the molecule thereof an aromatic ring or cylcoalkyl ring. It is preferably an aliphatic polyhydric alcohol ester with a valency of 2 to 20.

The polyhydric alcohol preferably used in the present invention is represented by the formula (a) below;

  General Formula (a)

(where, Ra represents an organic group with a valency of n which is a positive integer of 2 or larger, and OH group represents an alcoholic and/or phenolic hydroxy group.)

Preferable examples of the polyhydric alcohol include those listed below, with no intention of limiting the present invention. Exemplified are adonitol, arabitol, ethylene glycol, diethylene glycol, triethylene glycol, tetraethylene glycol, 1,2-propanediol, 1,3-propanediol, dipropylene glycol, tripropylene 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol. Particularly preferable are triethylene glycol, tetraethylene glycol, dipropylene glycol, tripropylene glycol, sorbitol, trimethylolpropane, and xylitol.

The monocarboxylic acid used for forming the polyhydric alcohol ester may be any of publicly known aliphatic monocarboxylic acid, alicyclic monocarboxylic acid, aromatic monocarboxylic acid and so forth, without special limitation. Use of alicyclic monocarboxylic acid or aromatic monocarboxylic acid is preferable in view of improving moisture permeability and retainability.

Preferable examples of the monocarboxylic acid include those listed below, with no intention of limiting the present invention.

The aliphatic monocarboxylic acid preferably used herein is a straight or branched-chain fatty acid having 1 to 32 carbon atoms, more preferably 1 to 20 carbon atoms, and furthermore preferably 1 to 10 carbon atoms. Inclusion of acetic acid is preferable in view enhancing compatibility with the cellulose ester. It is also preferable to use acetic acid in a mixed manner with other monocarboxylic acid.

Preferable examples of the aliphatic monocarboxylic acid include saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated fatty acid such as undecylenic acid, oleic acid, sorbic acid, linoleic acid, linolenic acid, and arachidonic acid.

Preferable examples of the alicyclic monocarboxylic acid include cyclopentanecarboxylic acid, cyclohexanecarboxylic acid, cyclooctanecarboxylic acid, and derivatives of these compounds.

Preferable examples of the aromatic monocarboxylic acid include benzoic acid; compound composed of a benzene ring of benzoic acid introduced with 1 to 3 alkyl groups, or alkoxy groups such as methoxy group or ethoxy group, such as toluic acid; and aromatic monocarboxylic acid having two or more benzene rings such as biphenylcarboxylic acid, naphthalenecarboxylic acid, and tetralincarboxylic acid, and derivatives of these compounds. Benzoic acid is particularly preferable.

Molecular weight of the polyhydric alcohol ester is preferably 300 to 1,500, and more preferably 350 to 750, although not specifically limited. Large molecular weight is preferable in view of suppressing the volatility, whereas small molecular weight is preferable in view of moisture permeability, and compatibility with the cellulose ester.

The carboxylic acid for composing the polyhydric alcohol may be used independently, or in the form of mixture of two or more species. OH groups in the polyhydric alcohol may entirely be esterified, or part of the OH groups may be left intact.

Alkylphthalylalkyl glycolates are preferably used as the glycolate-based plasticizer, but not limited thereto. Examples of the alkylphthalylalkyl glycolates include methylphthalylmethyl glycolate, ethylbhthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalyibutyl glycolate, butylphthalylpropyl glycolate, methylphthalyloctyl glycolate, ethylphthalyloctyl glycolate, octylphthalylmethyl glycolate, and octylphthalylethyl glycolate.

The phthalate ester-based plasticizer is exemplified by diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, and dicyclohexyl terephthalate.

The citrate ester-based plasticizer is exemplified by acetyl trimethyl citrate, acetyl triethyl citrate, and acetyl tributyl citrate.

The fatty acid ester-based plasticizer is exemplified by butyl oleate, methyl acetyl ricinolate, and dibutyl sebacate.

The phosphate ester-based plasticizer is exemplified by triphenyl phosphate, tricresyl phosphate, cresyldiphenyl phosphate, octyl diphenyl phosphate, diphenyl biphenyl phosphate, trioctyl phosphate, and tributyl phosphate.

The polyvalent carboxylate ester is formed between a polyvalent carboxylic acid with a valency of 2 or more, preferably with a valency of 2 to 20, and alcohols. Aliphatic polyvalent carboxylic acid preferably has a valency of 2 to 20, whereas aromatic polyvalent carboxylic acid and alicyclic polyvalent carboxylic acid preferably has a valency of 3 to 20.

The polyvalent carboxylic acid is represented by the general formula (B) below:

  Formula (B)

(where, Rb represents a (m+n)-valent organic group, m represents an integer of 2 or larger and 6 or smaller, n represents an integer of 0 or larger and 4 or smaller, COOH group represents a carboxy group, and OH group represents an alcoholic or phenolic hydroxy group.)

Preferable examples of the polyvalent carboxylic acid include those listed below, with no intention of limiting the present invention. The examples include aromatic polyvalent carboxylic acid with a valency of 3 or larger such as trimellitic acid, trimesic acid and pyromellitic acid and derivatives thereof; aliphatic polyvalent carboxylic acid such as succinic acid, adipic acid, azelaic acid, sebacic acid, oxalic acid, fumaric acid, maleic acid, and tetrahydrophthalic acid; and polyvalent oxycarboxylic acid such as tartaric acid, tartronic acid, malic acid and citric acid. In particular, polyvalent oxycarboxylic acid is preferably used in view of improving the retainability.

Alcohol used for composing the polyvalent carboxylate ester is selectable from publicly known alcohols and phenols, without special limitation. For example, straight or branched-chain aliphatic saturated alcohol or aliphatic unsaturated alcohol having 1 to 32 carbon atoms is preferably used. The number of carbon atoms is more preferably 1 to 20, and furthermore preferably 1 to 10. Also preferably used are alicyclic alcohols such as cyclopentanol and cyclohexanol or the derivatives thereof; and aromatic alcohol such as benzyl alcohol and cinnamyl alcohols or the derivatives thereof.

When the polyvalent oxycarboxylic acid is used as the polyvalent carboxylic acid, the alcoholic or phenolic hydroxy group of the polyvalent oxycarboxylic acid may be esterified using a monocarboxylic acid. Preferable examples of the monocarboxylic acid include those listed below, with no intention of limiting the present.

Straight or branched-chain fatty acid having 1 to 32 carbon atoms is preferably used as the aliphatic monocarboxylic acid. The number of carbon atoms is preferably 1 to 20, and particularly 1 to 10.

Preferable examples of the aliphatic monocarboxylic acid include saturated fatty acid such as acetic acid, propionic acid, butyric acid, valeric acid, caproic acid, enanthic acid, caprylic acid, pelargonic acid, capric acid, 2-ethylhexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid, arachidonic acid.

Preferable examples of the alicyclic monocarboxylic acid include cyclopentanecarboxylic acid, cyclohexanecarboxylic acid, cyclooctanecarboxylic acid, and the derivatives thereof.

Preferable examples of the aromatic monocarboxylic acid include benzoic acid; compound composed of a benzene ring of benzoic acid introduced with an alkyl group, such as toluic acid; and aromatic monocarboxylic acid having two or more rings such as biphenylcarboxylic acid, naphthalenecarboxylic acid and tetralincarboxylic acid, and derivatives of these compounds.

Among these monocarboxylic acids, particularly preferable are acetic acid, propionic acid and benzoic acid.

Molecular weight of the polyvalent carboxylate ester compound is preferably 300 to 1000, and more preferably 350 to 750, although not specifically limited. Large molecular weight is preferable in view of improving the retainability, whereas small molecular weight is preferable in view of moisture permeability, and compatibility with the cellulose ester.

The alcohols for composing the polyvalent carboxylate ester may be used independently, or in the form of mixture of two or more species.

Acid value of the polyvalent carboxylate ester compound is preferably 1 mg KOH/g or smaller, and more preferably 0.2 mg KOH/g or smaller. By adjusting the acid value within the above-described ranges, environment-dependent fluctuation in the retardation is preferably suppressed.

(Acid Value)

Acid value is defined as the number of milligrams of potassium hydroxide necessary for neutralizing acid contained in one gram of sample (carboxy group contained in the sample). The acid value is measured in compliance with JIS K0070.

Particularly preferable examples of the polyvalent carboxylate ester compound are listed below, with no intention of limiting the present invention. The examples include triethyl citrate, tributyl citrate, acetyl triethyl citrate (ATEC), acetyl tributyl citrate (ATBC), benzoyl tributyl citrate, acetyl triphenyl citrate, acetyl tribenzyl citrate, dibutyl tartarate, diacetyl dibutyl tartarate, tributyl trimellitate, and tetrabutyl pyromellitate.

Polyester-based plasticizer having in the molecule thereof an aromatic ring or cycloalkyl ring may be used as the polyester-based plasticizer, although not specifically limited. Aromatic-terminated ester-based plasticizer represented by the general formula (c) below may be used as the polyester-based plasticizer, although not specifically limited.

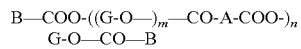  General Formula (c)

(in the formula, B represents a benzene ring, which may have other substituent. G represents a $C_{2-12}$ alkylene group or $C_{6-12}$ arylene group or $C_{4-12}$ oxyalkylene group, A represents a $C_{2-10}$ alkylene group or $C_{4-10}$ arylene group, and each of m and n represents the number of repeating units.)

The compound represented by the general formula (c) is synthesized from benzenemonocarboxylic acid represented by BCOOH; alkylene glycol or oxyalkylene glycol or aryl glycol represented by HO-(G-O—)$_l$H; and alkylene dicarboxylic acid or aryldicarboxylic acid represented by HOCO-A-COO—H, and is obtainable by a reaction similar to that for obtaining general polyester-based plasticizer. l represents the number of repeating units.

Examples of the benzenemonocarboxylic acid component as a source material of the polyester-based plasticizer include benzoic acid, paratertiary butylbenzoic acid, ortho-toluic acid, meta-toluic acid, para-toluic acid, dimethylbenzoic acid, ethylbenzoic acid, normal propylbenzoic acid, aminobenzoic acid, and acetoxy benzoic acid. These compounds may be used independently, or in the form of mixture of two or more species.

Examples of the alkylene glycol components as a source material for the polyester-based plasticizer include ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used independently, or in the form of mixture of two or more species. In particular, $C_{2-12}$ alkylene glycol is preferably used by virtue of its excellent compatibility with the cellulose ester.

Examples of the $C_{4-12}$ oxyalkylene glycol component as a source material for the aromatic-terminated ester include diethylene glycol, triethylene glycol, tetraethylene glycol, dipropylene glycol, and tripropylene glycol. These glycols may be used independently, or in the form of mixture of two or more species.

Examples of the $C_{4-12}$ alkylene dicarboxylic acid component as a source material for the aromatic-terminated ester include succinic acid, maleic acid, fumaric acid, glutaric acid, adipic acid, azelaic acid, sebacic acid, and dodecanedicarboxylic acid. These compounds may be used independently, or in the form of mixture of two or more species. Examples of the $C_{6-12}$ arylene dicarboxylic acid component include phthalic acid, terephthalic acid, isophthalic acid, 1,5-naphthalene dicarboxylic acid, and 1,4-naphthalene dicarboxylic acid.

The polyester-based plasticizer preferably has a number average molecular weight of 300 to 1,500, and more preferably 400 to 1,000. The acid value thereof is 0.5 mg KOH/g or smaller, the hydroxy group value is 25 mg KOH/g or smaller, and more preferably the acid value thereof is 0.3 mg KOH/g or smaller and the hydroxy group value is 15 mg KOH/g or smaller.

(UV Absorber)

The optical film of the present invention may also contain an UV absorber. The UV absorber is aimed at improving the durability by absorbing ultraviolet radiation of 400 nm or shorter. The optical film preferably shows a transmittance at 370 nm of 10% or smaller, more preferably 5% or smaller, and furthermore preferably 2% or smaller.

The UV absorber is exemplified by oxybenzophenone-based compound, benzotriazole-based compound, salicylate ester-based compound, benzophenone-based compound, cyanoacrylate-based compound, triazine-based compound, nickel complex-based compound, and inorganic powder, although not specifically limited.

Specific examples include 5-chloro-2-(3,5-di-sec-butyl-2-hydroxyphenyl)-2H-benzotriazole, (2-2H-benzotriazole-2-yl)-6-(straight and branched-chain dodecyl)-4-methylphenol, 2-hydroxy-4-benzyloxybenzophenone, 2,4-benzyloxybenzophenone, and Tinuvin Series products such as Tinuvin 109, Tinuvin 171, Tinuvin 234, Tinuvin 326, Tinuvin 327, Tinuvin 328, and Tinuvin 928 which are commercially available from BASF Japan Ltd.

Examples of the UV absorber preferably used in the present invention include benzotriazole-based UV absorber, benzophenone-based UV absorber and triazine-based UV absorber, and particularly benzotriazole-based UV absorber and benzophenone-based UV absorber.

In addition, also disk-shaped compounds such as those having 1,3,5-triazine ring are preferably used as the UV absorber.

The optical film of the present invention preferably contains two or more species of the UV absorber. Also polymer UV absorber is preferably used as the UV absorber, and in particular the polymer type UV absorbers described in JP-H06-148430A are preferably used.

The UV absorber may be added to a dope after being preliminarily dissolved into alcohol such as metanol, ethanol or butanol, or into an organic solvent such as methylene chloride, methyl acetate, acetone or dioxolane, or into any of mixed solvents of these solvents, or may be added directly to the dope composition.

Those insoluble to the organic solvent, such as inorganic powder, is added to the dope, after dispersed in the organic solvent and the cellulose ester using a dissolver or sand mill.

Amount of use of the UV absorber varies depending on species of the UV absorber, conditions of use and so forth. For the case where the dry thickness of the polarizing plate protective film is assumed to 30 to 200 µm, the amount of use is preferably 0.5 to 10% by mass, and more preferably 0.6 to 4% by mass, of the polarizing plate protective film.

(Antioxidant)

Antioxidant is also referred to as anti-deterioration agent. The optical film may degrade, if the liquid crystal display device or the like is allowed to stand in a high-humidity and high-temperature state.

The antioxidant retards or prevents decomposition of the optical film, typically due to halogen ascribable to the residual amount of solvent, or phosphoric acid ascribable to the phosphate-based plasticizer which remains in the optical film, so that it is preferably, contained in the optical film of the present invention.

Hindered phenol-based compound is preferably used as this sort of antioxidant, examples of which include 2,6-di-t-butyl-p-cresol, pentaerythrityl-tetrakis[3-(3,5-di-t-butyl-4-hydroxyphenyl)propi orate], triethylene glycol-bis[3-(3-t-butyl-5-methyl-4-hydroxyphenyl)propionate], 1,6-hexanediol-bis[3-(3,5-di-t-butyl-4-hydroxyphenyl) propionate], 2,4-bis(n-octylthio)-6-(4-hydroxy-3,5-di-t-butylanilino)-1,3,5-triazine, 2,2-thiodiethylene bis[3-(3,5-di-t-butyl-4-hydroxyphenyl)propionate], octadecyl-3-t-butyl-4-hydroxyphenyl)propionate, N,N'-hexamethylenebis (3,5-di-t-butyl-4-hydroxyhydrocinnamide), 1,3,5-trimethyl-2,4,6-tris(3,5-di-t-butyl-4-hydroxybenzyl)benzene, and tris (3,5-di-t-butyl-4-hydroxybenzyl)-isocyanulate.

Particularly preferable are 2,6-di-t-butyl-p-cresol, pentaerythrityl-tetrakis[3-(3,5-di-t-butyl-4 hydroxyphenyl) propi onate], and triethylene glycol-bis[3-(3-t-butyl-5-methyl-4-hydroxyphenyl)propionate]. It is also preferable to use a hydrazine-based metal deactivator such as N,N'-bis[3-(3,5-di-t-butyl-4-hydroxyphenyl)propionyl]hydrazine or a phosphorus-containing processing stabilizer such as tris(2,4-di-t-butylphenyl) phosphite in combination.

Amount of addition of these compounds is preferably 1 ppm to 1.0%, and more preferably 10 to 1000 ppm, of the total mass of the polymer (A) and the cellulose ester.

(Particle)

The optical film of the present invention preferably contains a particle.

Examples of inorganic compound as the particle include silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate and calcium phosphate. On the other hand, particle of organic compound is preferably used. Examples of the organic compound include crushed and classified product of organic polymer compound such as polytetrafluoroethylene, cellulose acetate, polystyrene, polymethyl methacrylate, polypropyl methacrylate, polymethyl acrylate, polyethylene carbonate, acryl-styrene-based resin, silicone-based resin, polycarbonate resin, benzoguanamine-based resin, melamine-based resin, polyolefinic powder, polyester-based resin, polyamide-based resin, polyimide-based resin, polyfluorinated ethylene-based resin, and starch. Besides them, polymer compound synthesized by suspension polymerization, polymer compound or inorganic compound shaped into spheres by spray drying or dispersion process may be used.

The particle preferably contains silicon in view of lowering the turbidity, wherein silicon dioxide is particularly preferable.

Average particle size of the primary particle of the particle is preferably 5 to 400 nm, and more preferably 10 to 300 nm. The particle may be contained in the form of secondary aggregate with a particle size of 0.05 to 0.3 μm. Alternatively, the particle may be contained in the form of primary particle without forming an aggregate, if the average particle size thereof is 100 to 400 nm.

Content of the particle in the polarizing plate protective film is preferably 0.01 to 1% by mass, and particularly 0.05 to 0.5% by mass. When the polarizing plate protective film has a multi-layered configuration formed by co-casting, such amount of addition of the particle is preferably contained in the surface layer.

The particle composed of silicon dioxide usable herein is commercially available, for example, under the trade names of Aerosil R972, R972V, R974, R812, 200, 200V, 300, R202, OX50, and TT600 (all from Nippon Aerosil Co. Ltd.).

The particle composed of zirconium oxide usable herein is commercially available, for example, under the trade names of Aerosil R976 and R811 (all from Nippon Aerosil Co. Ltd.).

Examples of the polymer include silicone resin, fluorine-containing resin and acrylic resin. Silicone resin is preferable, and those having a three-dimensional meshwork structure are particularly preferable. Usable herein are those commercially available, for example, under the trade names of Tospearl 103, ditto 105, ditto 108, ditto 120, ditto 145, ditto 3120 and ditto 240 (all from Toshiba Silicone K.K.).

Among them, Aerosil 200V and Aerosil R972V are in particular preferably used since they are strongly effective in reducing the friction coefficient, while keeping the turbidity of the polarizing plate protective film at a low level. In the polarizing plate protective film, at least one surface thereof preferably has a dynamic friction coefficient of 0.2 to 1.0.

The various additives may be added by batch to the dope, which is a resin-containing solution before being formed into a film, or may be added by in-line addition in the form of solution which is separately prepared. In particular, it is preferable to add a part of, or whole of the particle by in-line addition, in order to reduce load on a filter medium.

When the additive solution is added by in-line addition, a small amount of resin is preferably dissolved therein for the purpose of improving the compatibility with the dope. Amount of resin per 100 parts by mass of solvent is preferably 1 to 10 parts by mass, and more preferably 3 to 5 parts by mass.

The in-line addition and mixing in the present invention may be implemented by using an in-line mixer which is exemplified by Static Mixer (from Toray Engineering Co. Ltd.) and SWJ (Toray static in-tube mixer, Hi-Mixer).

(Method of Manufacturing)

Next, a method of manufacturing the optical film of the present invention will be explained.

The optical film of the present invention is preferably used irrespective of that it is a solution-cast film or melt-cast film.

The optical film of the present invention is manufactured by a step of preparing a dope by dissolving the resin and the additives into a solvent; a step of casting the dope over an endlessly traveling metal support; a step of drying the cast dope to thereby form a webs a step of separating the web from the metal support; a step of stretching or keeping the width unchanged; a step of further drying; and a step of taking up of the finished film.

The step of preparing a dope will be explained. Concentration of resin in the dope is preferably low in view of reducing load of drying after the casting over the metal support, however load of filtering will increase if the resin concentration is excessively high. For harmonization, the concentration is preferably 10 to 35% by mass, and more preferably 15 to 25% by mass.

The solvent used for the dope may be a single species, or a mixture of two or more species. It is preferable to use a good-soluble solvent and a poor-soluble solvent for the resin, and to use the good-soluble solvent in excess to the poor-soluble solvent. Ratio of mixing preferably falls in the range from 70 to 98% by mass for the good-soluble solvent, and 2 to 30% by mass for the poor-soluble solvent. The good-soluble solvent and the poor-soluble solvent herein are defined such that the good-soluble solvent is capable of solubilizing the resin to be used alone by itself, whereas the poor-soluble solvent is incapable of swelling or solubilizing the resin alone by itself. When a cellulose ester is used as the resin, the good solvent and the poor solvent will vary depending on average degree of substitution with acetyl group. For example, acetone is used as the good-soluble solvent for an acetate ester of cellulose (degree of substitution with acetyl group=2.4) and cellulose acetate propionate, whereas as the poor-soluble solvent for an acetate ester of cellulose (degree of substitution with acetyl group=2.8).

Examples of the good-soluble solvent include the organo-halogen compound such as methylene chloride, dioxolanes, acetone, methyl acetate, and methyl acetoacetate, although not specifically limited. Particularly preferable examples include methylene chloride and methyl acetate.

Preferable examples of the poor-soluble solvent include methanol, ethanol, n-butanol, cyclohexane, and cyclohexanone, although not specifically limited. The dope preferably contains 0.01 to 2% by mass of water. The solvent used for dissolving the resin is recycled from the film formation process in which the solvent removed from the film by drying is recovered. The recovered solvent may preferably be used even if it contains trace amounts of additives added to the resin, such as plasticizer, UV absorber, polymer, monomer component and so forth, or may be used after being purified as necessary.

A method of dissolving the resin, in the process of preparing the dope, is selectable from the general methods. Heating combined with pressurizing enables heating of the solvent above the boiling point at normal pressure. Stirring for dissolution at a temperature above the boiling point, under normal pressure, of the solvent but within the range not allowing the solvent to boil under pressure is preferable in view of preventing formation of massive insoluble matter called gel or lump. Also a method of moistening or swelling the resin by mixing it with the poor-soluble solvent, and then dissolving it by adding the good-soluble solvent, is preferably used.

The pressurizing is available by pressure-feeding an inert gas such as nitrogen gas, or allowing the solvent to express vapor pressure by heating. The heating from outside is preferably and a jacket-type heating system, for example, is preferable by virtue of its readiness in temperature control.

The heating temperature in the presence of the solvent is preferably high from the viewpoint of solubility of the resin, whereas an excessively high heating temperature may require higher pressure to thereby cause poor productivity. The heating temperature is preferably 45 to 120° C., more preferably 60 to 110° C., and furthermore preferably 70° C. to 105° C. The pressure is adjusted so as not allow the solvent to boil at a set temperature.

Alternatively, also the cooling solubilization method is preferably used, by which the cellulose ester or the like may be dissolved into a solvent such as methyl acetate.

Next, the solution containing the resin dissolved therein is filtered through an appropriate filter medium such as filter paper. Small absolute filter rating is preferable in view of removing insoluble matters, whereas the filter medium may suffer from clogging if the absolute filter rating is excessively small. Accordingly, the filter medium preferably has an absolute filter rating of 0.008 mm or smaller, more preferably 0.001 to 0.008 mm, and furthermore preferably 0.003 to 0.006 mm.

The filter medium used herein is selectable from general filter media without special limitation. Preferable examples include plastic media such as polypropylene and Teflon (registered trademark), and metal media such as stainless steel, which are free from peeling-off of fiber. The resin solution is preferably filtered so as to remove or reduce impurities contained in the source resin, in particular foreign matter causative of bright dot.

The foreign matter causative of bright dot herein is a dot (foreign matter) seen as leakage of light, when the optical film is placed between two polarizing plates arranged in the crossed nicols configuration, and the stack is illuminated from the side of one polarizing plate and observed from the side of the other polarizing plate. The number of bright dots of 0.01 mm or larger in diameter is preferably 200/$cm^2$ or below, more preferably 100/$cm^2$ or below, furthermore preferably 50/$m^2$ or below, and particularly 0 to 10/$cm^2$. Also population of dots of 0.01 mm or smaller in diameter is preferably small.

The dope may be filtered by any of general methods. In view of suppressing difference in filtration pressure (pressure difference) before and after the filtration, it preferable to proceed the filtration under heating in the temperature range not lower than the boiling point of the solvent at a normal pressure and not allowing the solvent to boil under pressure. The temperature range is preferably 45 to 120° C., more preferably 45 to 70° C. and furthermore preferably 45 to 55° C.

The smaller the filtration pressure, the better. The filtering pressure is preferably 1.6 MPa or smaller, more preferably 1.2 MPa or smaller and furthermore preferably 1.0 MPa or smaller.

Casting of the dope will now be explained.

The metal support used in the casting process is preferably mirror-finished on the surface thereof. The metal support preferably used is a stainless steel belt or a cast drum with a plated surface. Width of casting is selectable from 1 to 4 m. Temperature of the surface of the metal support in the casting process is adjustable in the range from −50° C. up to temperature lower than the boiling point of the solvent. The temperature is preferably high in view of accelerating the rate of drying of the web, whereas the web may foam or may be degraded in the planarity if the temperature is excessively high. The temperature of the support is preferably 0 to 40° C., and more preferably 5 to 30° C. Another preferable method is such as cooling the web to gellate, and then separating, from the drum, the web with a lot of residual solvent retained therein. Methods of controlling the temperature of the metal support is not specifically limited, and possible methods include a method of blowing a hot air or cool air and a method of bringing warm water into contact with the back surface of the metal support. The method of using warm water is more preferable since heat conduction is more effective so that the temperature of the metal support may be stabilized within a short time. When the hot air is used, the temperature of the air may occasionally be higher than a target temperature.

In order to ensuring a desirable planarity of the optical film, the amount of residual solvent of the web, when separated from the metal support, is preferably 10 to 150% by mass, more preferably 20 to 40% by mass or 60 to 130% by mass, and particularly 20 to 30% by mass or 70 to 120% by mass.

In the present invention, the amount of residual solvent is given by the equation below:

Amount of residual solvent (% by mass)=$\{(M-N)/N\} \times 100$ where, M represents mass of a sample collected at an arbitrary point of time in, or after, the process of manufacturing the web or film and N represents mass of the sample after heated at 115° C. for 1 hour.

In the process of drying the optical film, it is preferable that the web separated from the metal support is further dried to reduce the content of residual solvent down to 1% by mass or below, more preferably 0.1% by mass or below, and particularly 0 to 0.01% by mass or below.

In the film drying process, generally used is a roll drying method (by which the web is dried while allowing it to alternately travel over a large number of rolls disposed up and down), and a method of drying the web transferred using a tenter.

It is particularly preferable to stretch the optical film of the present invention widthwise (transversely) by the tenter system by which both edges of the web are held with clips or the like. The web is preferably separated at a strip tension of 300 N/m or lower.

Method of drying of the web is generally selectable from those making use of hot air, infrared radiation, heated roll, microwave and so forth, without special limitation. Hot air is preferable by virtue of its simplicity.

Drying temperature in the drying process of the web is preferably elevated in a stepwise manner from 40 to 200° C.

Thickness of the optical film is typically 10 to 200 μm, although not specifically limited. The thickness is preferably 10 to 100 μm and more preferably 20 to 60 μm.

The optical film of the present invention is 1 to 4 m wide, more preferably 1.4 to 4 m wide, and particularly 1.6 to 3 m wide. If the width exceeds 4 m, conveyance will be difficult.

(Stretching, Control of Refractive Index)

In the process of manufacturing the optical film of the present invention, it is preferable to control the refractive index, or control the retardation, by stretching.

For example, the web may be stretched in the longitudinal direction of the film (direction of film making) and in the direction orthogonal thereto in plane or in the widthwise direction, biaxially or uniaxially, in a sequential or simultaneous manner. The simultaneous biaxial stretching also include the case where the web is stretched in one direction, while relaxing tension in the other direction so as to allow the web to shrink.

Factors of stretching in two directions orthogonal to each other are preferably adjusted finally to 0.8 to 1.5 in the direction of casting and 1.1 to 2.5 in the widthwise direction, and more preferably to 0.9 to 1.0 in the direction of casting and 1.2 to 2.0 in the widthwise direction.

Stretching temperature is preferably 120° C. to 200° C. and more preferably 140° C. to 180° C.

Content of residual solvent in the film under stretching is preferably 20 to 0%, and more preferably 15 to 0%.

Method of stretching the web is not specifically limited. Examples of the method include a method of longitudinally stretching the web over a plurality of rolls given different levels of peripheral speed; a method of longitudinally stretching the web by holding both edges thereof with clips or pins and widening distance between the clips or pins in the machine direction; a similar method of transversely stretching the web by widening the distance in the transverse direction; and a method of longitudinally and transversely stretching the web by widening the distance at the same time in the longitudinal and transverse directions. Of course, these methods may be combined, in the so-called tenter process, the clips are preferably driven based on a linear drive system, since the stretching may be smoothened and a risk of rupture or the like may be reduced.

The keeping of width or transverse stretching in the film forming process may be accomplished by a tenter, where the tenter may be a pin tenter or a clip tenter. The stretching in the machine direction and transverse direction may take place simultaneously or sequentially.

(Optical Compensation Film)

Liquid crystal display generally has a viewing angle-related problem such that display performance degrades in an oblique view even if the axial view were good due to its intrinsic nature of using optically anisotropic liquid crystal material and polarizing plate. It is therefore preferable to use an optical compensation film which compensates the viewing angle for the purpose of improving the performance. Average refractive index distribution is large in the thickness-wise direction of the cell and small in the in-plane direction. Accordingly, an effective optical compensation film is such as canceling the anisotropy and having so-called negative uniaxial structure characterized by refractive index in the thickness-wise direction smaller than refractive index in the in-plane direction. The optical film of the present invention is also usable as the optical compensation film having the functions described above.

When the optical film of the present invention is used for the VA mode (a mode using vertically-aligned liquid crystal), one each (two in total) optical film may be used on both sides of the cell (two-sheet type) or one optical film may be used on either of the upper and lower sides of the cell (single-sheet type).

The optical film of the present invention preferably shows, in an environment of 23° C. and 55% RH when measured at 590 nm, a retardation Ro given by the equation below of 20 to 100 nm, and a retardation Rth, in an environment of 23° C. and 55% RH when measured at 590 nm, of 70 to 300 nm. The retardation values adjusted in the above described ranges are preferable for the purpose of compensating the viewing angle of the VA-mode liquid crystal display device.

$$Ro = (nx - ny) \times d \quad \text{Equation (I)}$$

$$Rth = \{(nx + ny)/2 - nz\} \times d \quad \text{Equation (II)}$$

(where, nx represents refractive index in the direction x in which the refractive index becomes maximum in the in-plane direction of the optical film, lay represents refractive index in the direction y normal to the direction x in the in-plane direction of the optical film, nz represents refractive index in the thickness-wise direction z of the optical film, and d (nm) represents thickness of the optical film.)

These retardation values may be measured using an automatic birefringence analyzer KOBRA-21ADH (from Oji Scientific instruments).

The optical film of the present invention, aimed at an optical compensation film with a stable phase difference, preferably shows a fluctuation range $\Delta Ro$ of retardation Ro in response to changes in humidity of smaller than 10%, defined by the equation (III) below:

$$\Delta Ro = \{[Ro(23°\,C., 10\%\,RH) - Ro(23°\,C., 80\%\,RH)]/Ro\,(23°\,C., 55\%\,RH)\} \times 100(\%) \quad \text{Equation (III)}$$

(in the formula, Ro(23° C., 10% RH), Ro(23° C., 80% RH) and Ro(23° C., 55% RH) represent in-plane retardation Ro, measured at 590 nm, of the phase difference film after being controlled in humidity respectively under environments of 23° C. and 10% RH, 23° C. and 80% RH, and 23° C. and 55% RH for 36 hours.)

Assuming now that the slow axis or the fast axis of the optical film of the present invention resides in the film plane and that the angle between the fast axis and the film formation direction is represented by θ1, the angle θ1 is preferably −1° or larger and +1° or smaller, and more preferably −0.5° or larger and +0.5° or smaller. The angle θ1 may be defined as alignment angle and may be measured using an automatic birefringence analyzer KOBRA-21ADH (from Oji Scientific Instruments) The angle θ1 adjusted to fall in the above-described ranges will contribute to high luminance of displayed images and suppression or prevention of leakage light, and will consequently contribute to faithful color reproduction in color liquid crystal display devices.

(Photoelastic Coefficient)

Photoelastic coefficient of the optical film of the present invention, measured with 590 nm light in an environment of 23° C., 55% RH is preferably $-5 \times 10^{-12}\,Pa^{-1}$ or larger and $10 \times 10^{-12}\,Pa^{-1}$ or smaller, more preferably $-2 \times 10^{-12}$ or larger and $8 \times 10^{-12}\,Pa^{-1}$ or smaller, and particularly 0 or larger and $5 \times 10^{-12}\,Pa^{-1}$ or smaller.

The photoelastic coefficient is measurable using a retardation analyzer (KOBRA-31PR, from Oji Scientific Instruments).

In the present invention, the photoelastic coefficient may be optimized within the ranges described above, by appropriately adjusting the ratio by mass of mixing of the polymer (A) and the cellulose ester according to the present invention, and by adjusting species and amount of other additives.

(Physical Properties)

Moisture transmission rate of the optical film of the present invention is preferably 10 to 1200 g/m²·24 h at 40° C., 90% RH. The moisture transmission rate may be measured in compliance with the method described in JIB Z0208.

Rupture elongation of the optical film of the present invention is preferably 10 to 80%.

Visible light transmittance of the optical film of the present invention is preferably 90% or above, and more preferably 93% or above.

Haze of the optical film of the present invention is preferably smaller than 1%, and more preferably 0 to 0.1.

A still wider range of phase difference value may be obtained by forming a liquid crystal layer or a resin layer by coating, or by further stretching the product.

(Polarizing Plate, Liquid Crystal Display Device)

The polarizing plate and the liquid crystal display device according to the present invention is obtained as a polarizing plate using the optical film of the present invention for the polarizing plate protective film, and as a liquid crystal display device using the polarizing plate. The optical film of the present invention is preferably configured as a film which also functions as a polarizing plate protective film, and if so, it is no longer necessary to separately provide the polarizing plate protective film and the optical film with phase difference, thereby the liquid crystal display device may be thinned and simplified in the manufacturing process.

The liquid crystal display device is preferably configured by a liquid crystal cell to both surfaces of which the polarizing plates are bonded while placing a tacky layer in between.

The polarizing plate may be manufactured by general methods. It is preferable to saponify the surface of the optical film of the present invention, on the side of bonding with the polarizer, with an alkali, and then to bond it onto at least one surface of the polarizer (manufactured by dipping into an iodine solution and by stretching), using an aqueous solution of fully-saponified poly(vinyl alcohol). On the other surface, other polarizing plate protective film may be bonded. The optical film of the present invention, when incorporated into a liquid crystal display device, is preferably provided on the liquid crystal cell side of the polarizer, wherein a conventional polarizing plate protective film may be used as a film on the external side of the polarizer.

Preferable examples of the conventional polarizing plate protective film include commercially available cellulose ester films (Konica-Minolta Tac KC8UX, KC5UX, KC8UCR3, KC8UCR4, KC8UCR5, KC8UY, KC6UY, KC4UY, KC4UE, KC8UE, KC8UY-HA, KC8UX-RHA, KC8UXW-RHA-C, KC8UXW-RHA-NC and KC4UXW-RHA-NC, all from Konica Minolta Opto Products Co., Ltd.).

The polarizing plate protective film used on the top surface side of the display device preferably has an anti-glare layer or clear hard coat layer, as well as anti-reflection film, anti-static film, anti-fouling layer, and back coat layer.

The polarizer, which is a major constituent of the polarizing plate, is an element allowing therethrough transmission of light having a polarization plane in a specific direction. Poly(vinyl alcohol)-based polarizing film is a representative polarizer publicly known at present and is classified into those dyed with iodine and those dyed with a dichroic dye.

The polarizer used herein is obtained by making a film using an aqueous poly(vinyl alcohol) solution, and by uniaxially stretching the film followed by dying, or by dying the film followed by uniaxial stretching, and then preferably by toughening the film using a boron compound. Thickness of the polarizer is preferably 5 to 30 μm, and particularly 10 to 20 μm.

By using the polarizing plate, configured by the optical film of the present invention, in the liquid crystal display device, it is now possible to manufacture various types of the liquid crystal display device with good visibility.

The optical film and the polarizing plate of the present invention are applicable to liquid crystal display devices based on various driving systems including STN, TN, OCE, HAN, VA (MVA, PVA), IPS and OCB.

It is particularly preferable to use them for VA (MVA, PVA)-mode liquid crystal display device.

Even for the liquid crystal display devices having large-sized screens, in particular with a screen size of 30 inches or larger, they are successfully reduced in the coloring in the state of black display due to leakage of light, and ensured by good visibility in terms of on-axis contrast.

EXAMPLE

The present invention will be explained in detail referring to Examples, without limiting the present invention. Note that the wording "part (s)" or "%" in Examples mean "part (s) by mass" or "% by mass" unless otherwise specifically noted.

(Exemplary Manufacture of Vinyl-Based Polymer)

Exemplary manufacture of the vinyl-based polymer in the present invention will be shown below, without limiting the present invention. The weight average molecular weight (Mw) and the molecular weight distribution (Mw/Mn) were calculated from results of gel permeation chromatography (GPC) under the conditions below:

Solvent: tetrahydrofuran
Column: TSK gel Super HM-M (from Tosoh Corporation)
Column temperature: 40° C.
Sample concentration: 0.1% by mass
Apparatus: HLC-8220 (from Tosoh Corporation)
Flow rate: 0.6 ml/min
Calibration curve: standard curve based on 13 samples of STK standard polystyrene (from Tosoh Corporation), Mw=1,000,000 to 500, used at nearly regular intervals.

(Exemplary Manufacture 1: Manufacture of Vinyl-Eased Polymer (A-1))

In a 300-ml four-necked flask equipped with a stirrer, a thermometer, a condenser tube and a nitrogen gas feeding pipe, 75 g of toluene was placed and refluxed under a nitrogen gas flow at 110° C. for 1 hour for deaeration. The reaction solvent was allowed to cool down to room temperature, added with 30.0 g (0.30 mol) of methyl methacrylate and 4.93 g of 2,2'-azobis(isobutyronitrile), the reaction solution was heated up to 80° C. and stirred for 3 hours. The solution was allowed to cool down to room temperature and then poured into 750 ml of heptane for reprecipitation. The precipitated solid was collected by filtration, washed with heptane, and dried at 80° C., 1 Torr for 5 hours, to obtain 28.0 g of a white solid polymer (A-1). The obtained polymer (A-1) was found to have a weight average molecular weight of 2,500, and a molecular weight distribution of 2.27.

(Exemplary Manufacture 2: Manufacture of Vinyl-Based Polymer (A-2)

In a 300-ml four-necked flask equipped with a stirrer, a thermometer, a condenser tube and a nitrogen gas feeding pipe, 75 g of tetrahydrofuran was placed and refluxed under a nitrogen gas flow at 66° C. for 1 hour for deaeration. The reaction solvent was allowed to cool down to room temperature, added with 30.0 g (0.30 mol) of methyl methacrylate, 0.49 g of 2,2'-azobis(isobutyronitrile) and 1.75 g of 1-octanethiol, the reaction solution was heated up to 60° C. and stirred for 5 hours. The solution was allowed to cool down to room temperature and then poured into 750 ml of heptane for reprecipitation. The precipitated solid was collected by filtration, washed with heptane, and dried at 80° C., 1 Torr for 5 hours, to obtain 23.7 g of a white solid polymer (A-2). The obtained polymer (A-2) was found to have a weight average molecular weight of 4,400 and a molecular weight distribution of 1.60.

(Exemplary Manufacture 3: Manufacture of Vinyl-Based Polymer (A-3))

In a 300-ml four necked flask equipped with a stirrer, a thermometer, a condenser tube and a nitrogen gas feeding pipe, 75 g of tetrahydrofuran was placed and refluxed under a nitrogen gas flow at 66° C. for 1 hour for deaeration. The reaction solvent was allowed to cool down to room temperature, added with 5.2 g (0.06 mol) of methyl acrylate, 24.0 g (0.24 mol) of methyl methacrylate, 0.49 g of 2,2'-azobis isobutyronitrile), and 1.41 g of 2-mercaptoethanol, the reaction solution was heated up to 60° C. and stirred for 5 hours. The solution was allowed to cool down to room temperature and then poured into 750 ml of heptane for reprecipitation. The precipitated solid was collected by filtration, washed with heptane, and dried at 80° C., 1 Torr (=133.322 Pa) for 5 hours to obtain 24.3 g of a white solid polymer (A-3). The obtained polymer (A-3) was found to have a weight average molecular weight of 3,100, and a molecular weight distribution of 1.77.

The obtained polymer (A-3) was subjected to $^1$H-NMR spectrometry and compositional ratios of the individual polymerization units were calculated as follow based on integrated spectral areas.
Methyl acrylate unit: 18% by mass
Methyl methacryalte unit: 82% by mass (Exemplary Manufacture 4: Manufacture of Vinyl-Eased Polymer (A-4))

In a 300-ml four-necked flask equipped with a stirrer, a thermometer, a condenser tube and a nitrogen gas feeding pipe, 75 g of toluene was placed and refluxed under a nitrogen gas flow at 110° C. for 1 hour for deaeration. The reaction solvent was allowed to cool down to room temperature, added with 24.0 g (0.24 mol) of methyl methacrylate, 11.3 g (0.06 mol) of 2-(2-methoxyethoxy)ethyl methacrylate, and 2.46 g of 2,2'-azobis(isobutyronitrile), the reaction solution was heated up to 80° C. and stirred for 3 hours. The solution was allowed to cool down to room temperature and then poured into 750 ml of heptane for reprecipitation. The precipitated solid was collected by filtration, washed with heptane, and dried at 80° C., 1 Torr for 5 hours, to obtain 29.8 g of a white solid polymer (A-4) The obtained polymer (A-4) was found to have a weight average molecular weight of 4,600, and a molecular weight distribution of 2.08.

The obtained polymer (A-4) was subjected to $^1$H-NMR spectrometry and compositional ratios of the individual polymerization units were calculated as follow based on integrated spectral areas.
Methyl methacrylate unit: 80% by mass
2-(2-Methoxyethoxy) ethyl methacrylate unit: 20% by mass (Exemplary Manufacture 5: Manufacture of Vinyl-Eased Polymer (A-5))

In a 300-ml four-necked flask equipped with a stirrer, a thermometer, a condenser tube and a nitrogen gas feeding pipe, 75 g of toluene was placed and refluxed under a nitrogen gas flow at 110° C. for 1 hour for deaeration. The reaction solvent was allowed to cool down to room temperature, added with 27.0 g (0.27 mol) of methyl methacrylate, 4.3 g (0.03 mol) of n-butyl methacrylate, and 4.93 g of 2,2'-azobis(isobutyronitrile), the reaction solution was heated up to 80° C. and stirred for 3 hours. The solution was allowed to cool down to room temperature and then poured into 750 ml of heptane for reprecipitation. The precipitated solid was collected by filtration, washed with heptane, and dried at 80° C., 1 Torr for 5 hours to obtain 27.1 g of a white solid polymer (A-5). The obtained polymer (A-5) was found to have a weight average molecular weight of 2,600, and a molecular weight distribution of 2.40.

The obtained polymer (A-5) was subjected to $^1$H-NMR spectrometry and compositional ratios of the individual polymerization units were calculated as follow based on integrated spectral areas.
Methyl methacrylate unit: 90% by mass
n-Butyl methacrylate unit: 10% by mass (Exemplary Manufacture 6: Manufacture of Vinyl-Based Polymer (A-6))

In a 300-ml four-necked flask equipped with a stirrer, a thermometer, a condenser tube and a nitrogen gas feeding pipe, 75 g of tetrahydrofuran was placed and refluxed under a nitrogen gas flow at 56° C. for 1 hour for deaeration. The reaction solvent was allowed to cool down to room temperature, added with 30.0 g (0.30 mol) of methyl methacrylate, 0.49 g of 2,2'-azobis(isobutyronitrile) and 11.2 g of 2-mercaptoethanol, and the reaction solution was heated up to 60° C. and stirred for 5 hours. The solution was allowed to cool down to room temperature and then poured into 750 ml of heptane for reprecipitation. The precipitated solid was collected by filtration, washed with heptane, and dried at 80° C., 1 Torr (=133.322 Pa) for 5 hours, to obtain 20.8 g of a white solid polymer (A-6). The obtained polymer (A-5) was found to have a weight average molecular weight of 600, and a molecular weight distribution of 3.00.

(Exemplary Manufacture 7: Manufacture of Vinyl-Based Polymer (A-7))

In a 300-ml four-necked flask equipped with a stirrer, a thermometer, a condenser tube and a nitrogen gas feeding pipe, 75 g of toluene was placed and refluxed under a nitrogen gas flow at 110° C. for 1 hour for deaeration. The reaction solvent was allowed to cool down to room temperature, added with 30.0 g (0.30 mol) of methyl methacrylate, and 1.23 g of 2,2'-azobis(isobutyronitrile) the reaction solution was heated up to 80° C. and stirred for 3 hours. The solution was allowed to cool down to room temperature and then poured into 750 ml of heptane for reprecipitation. The precipitated solid was collected by filtration, washed with heptane, and dried at 80° C., 1 Torr for 5 hours, to obtain 29.1 g of a white solid polymer (A-7) The obtained polymer (A-7) was found to have a weight average molecular weight of 10,000, and a molecular weight distribution of 2.40.

Comparative Polymers (B-1) to (B-6) were manufactured in the same way.

Example 1

Manufacture of Optical Film 101

| <Particle Dispersed Solution 1> | |
|---|---|
| Aerosil R972V (silica particle; primary particle size = 16 nm; from Nippon Aerosil Co, Ltd.) | 11 parts by mass |
| Ethanol | 89 parts by mass |

The materials were stirred and mixed in a dissolver for 50 minutes and then allowed to disperse using a Manton-Gaulin homogenizer.

<Particle Added Solution 1>

While methylene chloride placed in a dissolving tank was thoroughly stirred, the particle dispersed solution 1 was slowly added thereto, according to the composition below. The mixture was further allowed to disperse in an attritor so as to adjust the particle size of the secondary particle to a predetermined size. The mixture was filtered through Finemet NF from Nippon Seisen Co. Ltd., to thereby prepare particle added solution 1.

| Methylene chloride | 99 parts by mass |
|---|---|
| Particle dispersed solution 1 | 5 parts by mass |

(Preparation of Main Dope)

A main dope having the composition below was prepared, First, methylene chloride and ethanol were placed in a pressure dissolving tank. Into the pressure dissolving tank thus containing the solvents, added were cellulose ester 1, vinyl-based polymer (A-1) and particle added solution 1 under stirring. The mixture was stirred under heating for complete dissolution. The solution was filtered through Azumi filter paper No. 244 from Azumi Filter Paper Co. Ltd., to thereby prepare a main dope.

| <Composition of Main Dope> | |
|---|---|
| Methylene chloride | 340 parts by mass |
| Ethanol | 64 parts by mass |
| Cellulose ester 1 (cellulose acetate propionate having a degree of substitution with acetyl group of 0.12, and a degree of substitution of propionyl group of 1.53, number average molecular weight = 37,000 (indicated as CAP1 in Table)) | 70 parts by mass |
| Vinyl-based polymer (A-1) | 30 parts by mass |
| Particle added solution 1 | 1 parts by mass |

These materials were placed in a sealed container, and dissolved under stirring to thereby prepare a dope. The dope was then cast uniformly over a 1500-mm-wide stainless steel belt support at 33° C., using an endless belt casting apparatus. Temperature of the stainless steel belt was controlled at 30° C.

The solvent was dried on the stainless steel belt support, until the residual solvent content in the cast film is reduced to 75%, and the film was separated from the stainless steel belt under a strip tension of 130 N/m.

(A-1) Optical film 123 was manufactured similarly to the optical film 101, except that vinyl-based polymer (A-1) was altered to triphenyl phosphate (indicated as TPP in Table). Optical film 124 was manufactured similarly to the optical film 101, except that 100 parts by mass of cyclic olefin resin (ARTON-G7810, from JSR Corporation, indicated as ARTON in Table) was used in place of the cellulose ester 1 and vinyl-based polymer (A-1).

The optical film 116 and 118 were found to be turbid in white over the entire film, rather than being transparent.

Table 1 lists the cellulose esters used herein. In Table 1, the total degree of substitution means an average of the total degree of substitution with acyl groups substituted in a single glucose unit of the cellulose ester corresponding to the formula (1), and the total number of carbon atoms means an average of the total number of carbon atoms of the acyl groups substituted in a single glucose unit of the cellulose ester corresponding to the formula (2).

TABLE 1

| CELLULOSE ESTER | DEGREE OF SUBSTITUTION WITH ACETYL GROUP | DEGREE OF SUBSTITUTION WITH PORPIONYL GROUP | DEGREE OF SUBSTITUTION WITH BUTYRYL GROUP | TOTAL DEGREE OF SUBSTITUTION | TOTAL NUMBER OF CARBON ATOMS | NUMBER AVERAGE MOLECULAR WEIGHT |
|---|---|---|---|---|---|---|
| CAP1 | 0.12 | 1.53 | 0 | 1.65 | 4.83 | 37000 |
| CAP2 | 0.21 | 1.62 | 0 | 1.83 | 5.28 | 52000 |
| CAB | 0.15 | 0 | 1.09 | 1.24 | 4.66 | 35000 |
| DAC | 2.14 | 0 | 0 | 2.14 | 4.28 | 53000 |
| CAP3 | 1.12 | 1.06 | 0 | 2.18 | 5.42 | 52000 |
| CAP4 | 0.12 | 1.18 | 0 | 1.30 | 3.78 | 32000 |

The thus-separated optical film was stretched by 30% in the widthwise direction under heating at 140° C. using a tenter. Content of the residual solvent at the start of stretching was 15%.

Next, the film was dried while being conveyed through a drying zone with the aid of a large number of rolls. Drying temperature was adjusted to 130° C., and tension of conveyance was adjusted to 100 N/m.

An optical film 101 with a dry thickness of 30 μm was thus obtained.

Manufacture of Optical Films 102 to 124>

Optical films 102 to 122 were manufactured similarly to the optical film 101, except that the species and the amount of use (parts by mass) of the cellulose ester and the vinyl-based polymer were altered to those listed in Table 3, in place of using the cellulose ester 1 (CAP1) and vinyl-based polymer The number average molecular weight (Mn) of the cellulose ester was measured by gel permeation chromatography (GPC) under the conditions below:
Solvent: methylene chloride
Column: Shodex K806, K805, K803G (from Shows. Denko K.K., these three used in connection)
Column temperature: 25° C.
Sample concentration: 0.1% by mass
Detector: RI Model 504 (from GL Sciences Inc.)
Pump: L6000 (from Hitachi, Ltd.)
Flow rate: 1.0 ml/min
Calibration curve: standard curve based on 13 samples of STK standard polystyrene (from Tosoh Corporation), Mw=1,000,000 to 500, used at nearly regular intervals.

The vinyl-based polymers and comparative polymers used herein are listed in Table 2.

TABLE 2

| VINYL-BASED POLYMER OR COMPARATIVE POLYMER | MONOMER 1 | | | MONOMER 2 | | | WEIGHT AVERAGE MOLECULAR WEIGHT Mw | MOLECULAR WEIGHT DISTRIBUTION Mw/Mn |
|---|---|---|---|---|---|---|---|---|
| | SPECIES | SP VALUE | PARTS BY MASS | SPECIES | SP VALUE | PARTS BY MASS | | |
| A-1 | METHYL METHACRYLATE | 18.3 | 100 | NONE | — | — | 2500 | 2.27 |
| A-2 | METHYL METHACRYLATE | 18.3 | 100 | NONE | — | — | 4400 | 1.60 |
| A-3 | METHYL METHACRYLATE | 18.3 | 82 | METHYL ACRYLATE | 18.2 | 18 | 3100 | 1.77 |

TABLE 2-continued

| VINYL-BASED POLYMER OR COMPARATIVE POLYMER | MONOMER 1 | | | MONOMER 2 | | | WEIGHT AVERAGE MOLECULAR WEIGHT Mw | MOLECULAR WEIGHT DISTRIBUTION Mw/Mn |
|---|---|---|---|---|---|---|---|---|
| | SPECIES | SP VALUE | PARTS BY MASS | SPECIES | SP VALUE | PARTS BY MASS | | |
| A-4 | METHYL METHACRYLATE | 18.3 | 80 | 2-(2-METHOXYETHOXY)ETHYL METHACRYLATE | 19.1 | 20 | 4600 | 2.08 |
| A-5 | METHYL METHACRYLATE | 18.3 | 90 | n-BUTYL METHACRYLATE | 17.7 | 10 | 2600 | 2.40 |
| A-6 | METHYL METHACRYLATE | 18.3 | 100 | NONE | — | — | 600 | 3.00 |
| A-7 | METHYL METHACRYLATE | 18.3 | 100 | NONE | — | — | 10000 | 2.40 |
| B-1 | METHYL METHACRYLATE | 18.3 | 100 | NONE | — | — | 400 | 3.00 |
| B-2 | METHYL METHACRYLATE | 18.3 | 100 | NONE | — | — | 15000 | 2.40 |
| B-3 | METHYL METHACRYLATE | 18.3 | 70 | TETRAHYDROFURFURYL METHACRYLATE | 20.3 | 30 | 3500 | 1.82 |
| B-4 | METHYL METHACRYLATE | 18.3 | 90 | 2-ETHYLHEXYL METHACRYLATE | 17.2 | 10 | 2600 | 2.40 |
| B-5 | METHYL METHACRYLATE | 18.3 | 70 | 2-HYDROXYETHYL METHACRYLATE | 23.9 | 30 | 4000 | 2.00 |
| B-6 | STYRENE | 17.9 | 30 | 4-HYDROXYSTYRENE | 24.7 | 70 | 2000 | 2.20 |

<Evaluation of Optical Film>

The individual optical films manufactured as described above were evaluated with respect to the items below:

(Measurement of Retardation)

Retardation value of each sample of the thus-obtained optical films was measured at the widthwise center thereof. Measurement of three-dimensional birefringence was conducted using an automatic birefringence analyzer KOBRA-21ADH (from Oji Scientific Instruments) under an environment of 23° C. and 55% RH, at 590 nm, and measured values were substituted into the equations below:

$$\text{in-plane retardation } Ro = (nx - ny) \times d \quad \text{Equation (I)}$$

$$\text{thickness-wise retardation } Rth = ((nx + ny)/2 - nz) \times d \quad \text{Equation (II)}$$

In the formula, d represents film thickness (nm), nx represents in-plane maximum refractive index of the film, also referred to as refractive index in the direction of slow axis, ny represents in-plane refractive index of the film measured in the direction normal to the slow axis, and nz represents thickness-wise refractive index of the films.

(Evaluation of Fluctuation Range of Retardation in Response to Changes in Humidity)

Magnitude of fluctuation range ΔRo of retardation in response to changes in humidity, defined by the equation (III) below, was evaluated. The automatic birefringence analyzer described above was used for the measurement.

$$\Delta Ro = \{[(23° C., 10\% RH) - Ro(23° C., 80\% RH)]/Ro(23° C., 55\% RH)\} \times 100 (\%) \quad \text{Equation (III)}$$

In the formula, Ro(23° C., 10% RH) Ro(23° C., 80% RH) and Ro(23° C., 55% RH) represent in-plane retardation Ro, measured at 590 nm, of the phase difference film after being controlled in humidity respectively under environments of 23° C. and 10% RH, 23° C. and 80% RH, and 23° C. and 55% RH for 36 hours.

The fluctuation range ΔRo of retardation in response to changes in humidity was ranked to any of the levels below:

A: 0% or larger, smaller than 5%;

B: 5% or larger, smaller than 10%;

C: 10% or larger, smaller than 15%; and

D: 15% or larger.

(Measurement of Photoelastic Coefficient)

The thus-obtained sample of the optical film was held at both widthwise edges, in-plane retardation (Ro) of the film was measured under application of load thereto, and the measured value was divided by the thickness (d) of the film to determine Δn (=Ro/d). Δn was determined under various load to thereby obtain a load-Δn curve, and the slope thereof was determined as photoelastic coefficient. The in-plane retardation (Ro) of the film was measured at 590 nm, using a retardation analyzer (KOBRA-31PR, from Oji Scientific Instruments), under an environment of 23° C., 55% RH.

The in-plane retardation Ro, the thickness-wise retardation Rth, the fluctuation range ΔRo of retardation in response to changes in humidity, and the photoelastic coefficient thus determined were summarized in Table 3.

TABLE 3

| OPTICAL FILM | CELLULOSE ESTER | | VINYL-BASED POLYMER OR COMPARATIVE POLYMER | | RETARDATION | | | PHOTOELASTIC COEFFICIENT | |
|---|---|---|---|---|---|---|---|---|---|
| No. | SPECIES | PARTS BY MASS | SPECIES | PARTS BY MASS | Ro (nm) | Rth (nm) | ΔRo | ($\times 10^{-12} Pa^{-1}$) | REMARKS |
| 101 | CAP1 | 65 | A-1 | 35 | 50 | 123 | A | 5 | INVENTION |
| 102 | CAP2 | 65 | A-1 | 35 | 40 | 101 | A | 6 | INVENTION |

TABLE 3-continued

| OPTICAL FILM No. | CELLULOSE ESTER SPECIES | PARTS BY MASS | VINYL-BASED POLYMER OR COMPARATIVE POLYMER SPECIES | PARTS BY MASS | RETARDATION Ro (nm) | Rth (nm) | $\Delta Ro$ | PHOTOELASTIC COEFFICIENT ($\times 10^{-12} Pa^{-1}$) | REMARKS |
|---|---|---|---|---|---|---|---|---|---|
| 103 | CAB | 65 | A-1 | 35 | 55 | 122 | A | 6 | INVENTION |
| 104 | CAP1 | 65 | A-2 | 35 | 55 | 133 | A | 4 | INVENTION |
| 105 | CAP1 | 65 | A-3 | 35 | 47 | 118 | A | 5 | INVENTION |
| 106 | CAP1 | 65 | A-4 | 35 | 41 | 98 | B | 6 | INVENTION |
| 107 | CAP1 | 65 | A-5 | 35 | 50 | 120 | A | 5 | INVENTION |
| 108 | CAP1 | 65 | A-6 | 35 | 38 | 99 | B | 7 | INVENTION |
| 109 | CAP1 | 65 | A-7 | 35 | 52 | 123 | A | 5 | INVENTION |
| 110 | CAP1 | 80 | A-1 | 20 | 58 | 154 | B | 8 | INVENTION |
| 111 | CAP1 | 95 | A-1 | 5 | 60 | 166 | B | 9 | INVENTION |
| 112 | CAP1 | 55 | A-1 | 45 | 33 | 93 | A | 4 | INVENTION |
| 113 | CAP1 | 100 | A-1 | 0 | 65 | 205 | D | 13 | COMP. EX. |
| 114 | CAP1 | 40 | A-1 | 60 | 18 | 56 | A | 2 | COMP. EX. |
| 115 | CAP1 | 65 | B-1 | 35 | 18 | 60 | B | 12 | COMP. EX. |
| 116 | CAP1 | 65 | B-2 | 35 | TRANSPARENT FILM NOT OBTAINED | | | | COMP. EX. |
| 117 | CAP1 | 65 | B-3 | 35 | 22 | 62 | C | 11 | COMP. EX. |
| 118 | CAP1 | 65 | B-4 | 35 | TRANSPARENT FILM NOT OBTAINED | | | | COMP. EX. |
| 119 | DAC | 65 | A-1 | 35 | 20 | 75 | A | 6 | COMP. EX. |
| 120 | DAC | 65 | B-5 | 35 | 24 | 60 | C | 7 | COMP. EX. |
| 121 | CAP3 | 65 | B-6 | 35 | 11 | 21 | D | 16 | COMP. EX. |
| 122 | CAP4 | 65 | A-1 | 35 | 64 | 144 | D | 7 | COMP. EX. |
| 123 | CAP1 | 65 | TPP | 35 | 72 | 117 | D | 18 | COMP. EX. |
| 124 | ARTON 100 PARTS BY MASS | | | | 17 | 41 | B | 6 | COMP. EX. |

It is clearly known from Table 3 that the optical films of the present invention, as compared with the comparative optical films, are larger in the retardation, smaller in the fluctuation range of retardation in response to changes in humidity, and smaller in the photoelastic coefficient, proving them as excellent optical films for practical use.

Example 2

Manufacture of Polarizing Plate

A poly(vinyl alcohol) film of 120 μm thick was uniaxially stretched (temperature=110° C., factor of stretching=5).

The stretched film was dipped in an aqueous solution composed of 0.075 g of iodine, 5 g potassium iodide, and 100 g of water for 60 seconds, and then dipped in an aqueous solution composed of 6 g of potassium iodide, 7.5 g of boric acid and 100 g of water at 68° C. The film was then washed with water and dried, to thereby obtain a polarizer.

Next, each of the optical films 101 to 115, 117 and 119 to 124 was bonded to the top surface of the polarizer, and Konica Minolta Tac KC4UY (cellulose ester film, from Konica Minolta Opto Products Co., Ltd.) was bonded to the back surface, according to the steps 1 to 5 described in the next, to thereby manufacture a polarizing plate.

Step 1: Each of the optical films 101 to 115, 117 and 119 to 124 was dipped in a 1.5 mol/L potassium hydroxide solution at 70° C. for 90 seconds, washed with water and dried, to thereby obtain an optical film saponified on the surface on the side to be bonded to the polarizer.

Step 2: The polarizer was dipped into a tank of a poly(vinyl alcohol) adhesive with a solid content of 2% by mass for 1 to 2 seconds.

Step 3: The polarizer was gently wiped so as to remove an excessive portion of the adhesive adhered thereon in Step 2, and then placed on the optical film processed in Step 1.

Step 4: The Konica Minolta Tac KC4UY optical film was placed on the polarizer side of the stack obtained in Step 3 by stacking each of the optical films 101 to 115, 117, 119 to 124 and the polarizer, and then bonded under a pressure of 20 to 30 N/cm², and a conveying speed of approximately 2 m/min.

Step 5: The samples of the stacks manufactured in Step 4, which are composed of the polarizer, the optical films 101 to 115, 117 and 119 to 124, and Konica Minolta Tac KC4UY, were placed in a drying oven and dried for 2 minutes, to thereby manufacture correspondent polarizing plates 101 to 115, 117 and 119 to 124, respectively.

Note that the optical film 124 was failed in bonding according to the alkali treatment descried above, and so that the polarizing plate could not be manufactured by the processing described above.

[Evaluation of Polarizing Plate]

Next, the bond ability of the optical film and the polarizer was evaluated as described below.

(Bondability)

The polarizing plates obtained as described above were treated at 80° C., 90% RH for 1200 hours, the state of bonding between the cellulose ester films and the polarizers were observed, and the results were ranked according to the criteria below. Results were summarized in Table 4.

A: No separation (excellent level for practical use);
B: slight separation (no problem for practical use);
C: separation found (problematic for practical use); and
D: separation found over very wide area (problematic for practical use)

(Evaluation of Coloration of Saponifying Solution)

The optical films 101 to 115, 117 and 119 to 123 were cut into 5 cm×24 cm pieces, and the pieces were dipped in 40 g of a 1.5 mol/L aqueous potassium hydroxide solution at 70° C. for 30 hours. Next, absorption spectrum of the aqueous potassium hydroxide solution, in which the optical film was dipped for 120 hours, was measured using a spectrophotometer U-3310 from Hitachi High-Technologies Corporation, and tristimulus values X, Y and Z were calculated. Using the tristimulus values X, Y and Z, yellowness index YI was calculated in compliance with JIS K7103 and the coloration was ranked according to the criteria below. Results were summarized in Table 4.

A: Yellowness index YI<1.0 (excellent level for practical use);

B: 1.0≤yellowness index YI<3.0 (no problem for practical use)

C: 3.0≤yellowness index YI<5.0 (no problem for practical use); and

D: 5.0≤yellowness index YI (problematic for practical use).

<Manufacture of Liquid Crystal Display Device>

A liquid crystal panel to be measured with respect to viewing angle was manufactured as described below, and characteristics of the resultant liquid crystal display device were evaluated.

Polarizing plates preliminarily bonded to both surfaces of a 40-inch display KLV-40J3000 from SONY Corporation were separated, and each of the polarizing plates 101 to 115, 117 and 119 to 123 manufactured above were bonded to both glass surfaces of the liquid crystal cell.

In this process, the polarizing plate was bonded so as to oppose the surface of the optical film of the present invention with the liquid crystal cell, and so as to align the absorption axes of the polarizing plates 101 to 115, 117 and 119 to 123 in the same direction with the absorption axes of the previously bonded polarizing plates, to thereby manufacture the correspondent liquid crystal display devices 101 to 115, 117 and 119 to 123.

(Evaluation of Characteristics of Resultant Liquid Crystal Display Device)

The liquid crystal display devices manufactured above were evaluated as described below.

(Frame-Like Nonuniformity)

The individual liquid crystal display devices obtained above were stored under an environment of 45±2° C., 95+3% RH for 24 hours. The liquid crystal display devices were then immediately transferred to a chamber conditioned at 23° C., 55% RH, and a back light of the panel was turned on. After 24 hours of illumination, the axial (on-axis) luminance was measured at four corners of the panel in the state of black display, and an average value was calculated. Note that each of "four corners" in this context is defined by a position on the diagonal lines of the effective display screen and 50 mm away from each corner.

For the individual liquid crystal display devices, occurrence of frame-like nonuniformity was evaluated based on ratio of an average value of the axial luminance at four corners, and axial luminance at the center of screen, and evaluated according to the four-rank system defined as below. The axial luminance at the center of screen of the liquid crystal display device was assumed as 1. Results were summarized in Table 4.

Rank of Evaluation

A: No Frame-Like Nonuniformity (averaged axial luminance at four corners: 1.00 to 1.05);

B: frame-like nonuniformity not observable by naked eyes (averaged axial luminance at four corners: 1.06 to 1.10);

C: frame-like nonuniformity observable but of no problem for practical use (averaged axial luminance at four corners: 1.11 to 1.20); and D: problematic in view of display quality (averaged axial luminance at four corners: 1.21 or larger).

TABLE 4

| POLARIZING PLATE No. | BONDABILITY | COLORATION OF SAPONIFYING SOLUTION | LIQUID CRYSTAL DISPLAY DEVICE No. | FRAME-LIKE NON-UNIFORMITY | REMARKS |
| --- | --- | --- | --- | --- | --- |
| 101 | A | A | 101 | A | INVENTION |
| 102 | A | A | 102 | A | INVENTION |
| 103 | A | A | 103 | B | INVENTION |
| 104 | A | A | 104 | A | INVENTION |
| 105 | A | A | 105 | A | INVENTION |
| 106 | A | B | 106 | B | INVENTION |
| 107 | B | A | 107 | A | INVENTION |
| 108 | A | B | 108 | B | INVENTION |
| 109 | A | A | 109 | A | INVENTION |
| 110 | B | B | 110 | B | INVENTION |
| 111 | B | C | 111 | C | INVENTION |
| 112 | B | A | 112 | A | INVENTION |
| 113 | D | D | 113 | D | COMP. EX. |
| 114 | D | A | 114 | A | COMP. EX. |
| 115 | B | B | 115 | D | COMP. EX. |
| 116 | — | — | 116 | — | COMP. EX. |
| 117 | C | C | 117 | D | COMP. EX. |
| 118 | — | — | 118 | — | COMP. EX. |
| 119 | D | A | 119 | B | COMP. EX. |
| 120 | D | B | 120 | B | COMP. EX. |
| 121 | D | A | 121 | D | COMP. EX, |
| 122 | B | D | 122 | B | COMP. EX, |
| 123 | D | D | 123 | D | COMP. EX. |
| 124 | UNBONDABLE | — | 124 | — | COMP. EX. |

It is clearly known from Table 4 that the optical films of the present invention, as compared with the comparative optical films, are more excellent in the bondability with the polarizer, and smaller in coloration, of the saponifying solution caused by elution of the cellulose ester into the saponifying solution. It is also known that liquid crystal display devices of the present invention, as compared with the comparative liquid crystal display devices, show less degrees of frame-like nonuniformity, proving that the liquid crystal display device of the present invention is excellent, for practical use.

The invention claimed is:

1. An optical film comprising a cellulose ester (A) which satisfies formulae (1) and (2) below and a vinyl-based polymer (B), wherein;

a content ratio of the cellulose ester (A) and the vinyl-based polymer (B) is within a range from 95:5 to 50:50 by mass, the cellulose ester (A) is a cellulose acetate propionate or a cellulose acetate butyrate, the cellulose ester (A) having a molecular weight of from 32,000 to 52,000, the vinyl-based polymer (B) is composed of a non-aromatic vinyl-based monomer having a solubility parameter of 17.5 (MPa$^{1/2}$) or larger and smaller than 20.0 (MPa$^{1/2}$), the non-aromatic vinyl-based monomer of the vinyl-based polymer (B) comprises 70% by mass or more of methyl methacrylate, and a weight average molecular weight of the vinyl-based polymer (B) is within a range from 500 to 10,000:

$$1.0 \leq X + \Sigma Y_i < 2.0 \qquad \text{formula (1)}$$

$$4.0 \leq 2 \times X + \Sigma(n_i \times Y_i) < 6.0 \qquad \text{formula (2)}$$

wherein X represents a degree of substitution with acetyl group, $Y_i$ represents a degree of substitution with acyl group having 3 or more carbon atoms, and $n_i$ represents a number of carbon atoms of the acyl group having 3 or more carbon atoms, and i represents an integer of 3 or larger, which equals to the number of carbon atoms $n_i$.

2. The optical film of claim 1, wherein the content ratio of the cellulose ester (A) and the vinyl-based polymer (B) is within a range from 80:20 to 51:49 by mass.

3. The optical film of claim 1, wherein the vinyl-based polymer has a molecular weight distribution (Mw/Mn) of 1.1 or larger and 2.5 or smaller.

4. The optical film of claim 1, wherein the cellulose ester is the cellulose acetate propionate.

5. The optical film of claim 1, wherein a retardation Ro given by equation (I) below is 20 to 100 nm, and a retardation Rth given by equation (II) below is 70 to 300 nm, both measured under an environment of 23° C. and 55% RH with a light having a wavelength of 590 nm:

$$Ro = (nx - ny) \times d \qquad \text{equation (I)}$$

$$Rth = \{(nx + ny)/2 - nz\} \times d \qquad \text{equation (II)}$$

wherein nx represents a refractive index in a direction x in plane of the optical film in which the refractive index gives a maximum, ny represents a refractive index in a direction y normal to the direction x in plane of the optical film, nz represents a refractive index in a thickness-wise direction z of the optical film, and d (nm) represents a thickness of the optical film.

6. The optical film of claim 1, wherein a fluctuation range ΔRo of a retardation Ro, given by equation (III) below, in response to changes in humidity is smaller than 10%:

$$\Delta Ro = \{[Ro(23° C., 10\% RH) - Ro(23° C., 80\% RH)]/Ro(23° C., 55\% RH)\} \times 100(\%) \qquad \text{equation (III)}$$

wherein Ro(23° C.,10% RH), Ro(23° C.,80% RH) and Ro(23° C.,55% RH) represent in-plane retardation Ro of the optical film after controlled in humidity under environments of 23° C. and 10% RH, 23° C. and 80% RH, and 23° C. and 55% RH for 36 hours, respectively, and measured at a measurement wavelength of 590 nm.

7. The optical film of claim 1, wherein a photoelastic coefficient of the optical film is $-5 \times 10^{-12}$ Pa$^{-1}$ or larger and $10 \times 10^{-12}$ Pa$^{-1}$ or smaller, which is measured under an environment of 23° C. and 55% RH and with a light having a wavelength of 590 nm.

8. A polarizing plate comprising the optical film according to claim 1, on at least one surface of a polarizer.

9. A liquid crystal display device comprising the polarizing plate according to claim 8 on at least one surface of a liquid crystal cell.

* * * * *